US00RE35630E

United States Patent [19]

Saito et al.

[11] E Patent Number: Re. 35,630

[45] Reissued Date of Patent: Oct. 14, 1997

[54] OVER WRITE CAPABLE MAGNETOOPTICAL RECORDING MEDIUM, RECORDING METHOD AND APPARATUS USING THE SAME

[75] Inventors: Jun Saito, Tokyo; Masatoshi Sato, Machida; Hiroyuki Matsumoto, Tokyo, all of Japan

[73] Assignee: Nikon Corporation, Tokyo, Japan

[21] Appl. No.: 269,395

[22] Filed: Jun. 30, 1994

Related U.S. Patent Documents

Reissue of:

[64] Patent No.: 5,126,986
Issued: Jun. 30, 1992
Appl. No.: 668,376
Filed: Mar. 11, 1991

U.S. Applications:

[60] Continuation of Ser. No. 471,524, Jan. 29, 1990, abandoned, which is a division of Ser. No. 192,764, May 10, 1988, Pat. No. 4,910,622.

[30] Foreign Application Priority Data

May 18, 1987 [JP] Japan ..... 62-120642

[51] Int. Cl.[6] ..... G11B 11/00

[52] U.S. Cl. ..... 369/13; 360/59

[58] Field of Search ..... 369/13, 14, 110, 369/116; 360/59, 114, 66; 365/122

[56] References Cited

U.S. PATENT DOCUMENTS

| | | | |
|---|---|---|---|
| 4,660,190 | 4/1987 | Fujii et al. | 369/13 |
| 4,672,594 | 6/1987 | Kato et al. | 369/13 |
| 4,855,975 | 8/1989 | Akasaka et al. | 365/122 |

*Primary Examiner*—Tan Dinh
*Attorney, Agent, or Firm*—Shapiro and Shapiro

[57] ABSTRACT

A multi-layered magnetooptical recording medium that satisfies predetermined formulas is over write capable when used, in a recording method and apparatus, with a jointing field, i.e., a magnetic field the intensity of which decreases continuously from an initial field to a bias field having the same direction as the initial field, permitting greater freedom in the choice of media compositions. In a two-layer structure including magnetically coupled recording and reference layers, recorded data may advantageously be reproduced from the reference layer.

14 Claims, 14 Drawing Sheets

OVER WRITE CAPABLE MAGNETOOPTICAL RECORDING MEDIUM, RECORDING METHOD AND APPARATUS USING THE SAME

Matter enclosed in heavy brackets [ ] appears in the original patent but forms no part of this reissue specification; matter printed in italics indicates the additions made by reissue.

This is a continuation of application Ser. No. 471,524 filed Jan. 29, 1990, now abandoned, which is a division of application Ser. No. 192,764 filed May 10, 1988, now U.S. Pat. No. 4,910,622, issued Mar. 20, 1990.

BACKGROUND OF THE INVENTION

1. Field of the Invention

The present invention relates to an over write capable magnetooptical recording medium, and a recording method and apparatus and a reproduction method and apparatus using the same.

2. Related Background Art

In recent years, many efforts have been made to develop an optical recording/reproduction method, an optical recording apparatus and a medium used therefor, which can satisfy various requirements including high density, large capacity, high speed access, and high recording/reproduction speed.

Of various optical recording/reproduction methods, the magnetooptical recording/reproduction method is most attractive due to its unique advantages that information can be erased after use and new information can be written thereon.

A recording medium used in a magnetooptical recording/reproduction method has a perpendicular magnetic anisotropy layer or layers as a recording layer. The magnetic layer comprises, for example, amorphous GdFe, GdCo, GdFeCo, TbFe, TbCo, TbFeCo, and the like. Concentric or spiral tracks are formed on the recording layer, and data is recorded on the tracks. Note that in this specification, one of the "upward" and "downward" directions of magnetization with respect to a film surface is defined as an "A direction" and the other one is defined as a "non-A direction". Data to be recorded is binarized in advance, and is recorded by a bit ($B_1$) having "A-directed" magnetization and a bit ($B_0$) having "non-A-directed" magnetization. These bits $B_1$ and $B_0$ correspond to "1 " and "0" levels of a digital signal, respectively. In general, the direction of magnetization of the recording tracks can be aligned in the "non-A direction" by applying a strong bias field before recording. This processing is called "initialization". Thereafter, the bit ($B_1$) having "A-directed" magnetization is formed on the tracks. Data is recorded in accordance with the presence/absence and/or a bit length of the bit ($B_1$).

PRINCIPLE OF BIT FORMATION

In the bit formation, a characteristic feature of a laser, i.e., excellent coherence in space and time, is effectively used to focus a beam into a spot as small as the diffraction limit determined by the wavelength of the laser light. The focused light is radiated onto the track surface to write data by producing bits less than 1 μm in width on the recording layer. In optical recording, a recording density up to $10^8$ bit/cm$^2$ can be theoretically attained, since a laser beam can be concentrated into a spot with a size as small as its wavelength.

As shown in FIG. 1, in magnetooptical recording, a laser beam L is focused onto a recording layer 1 to heat it, while a bias field (Hb) is externally applied to the heated portion in the direction opposite the initialized direction. A coercivity Hc of the locally heated portion is decreased below the bias field (Hb). As a result, the direction of magnetization of that portion is aligned in the direction of the bias field (Hb). In this way, reversely magnetized bits are formed.

Ferromagnetic and ferromagnetic materials differ in the temperature dependencies of the magnetization and Hc. Ferromagnetic materials have Hc which decreases around the Curie temperature and allow data recording based on this phenomenon. Thus, data recording in ferromagnetic materials is referred to as Tc recording (Curie temperature recording).

On the other hand, ferromagnetic materials have a compensation temperature, below the Curie temperature, at which magnetization (M) becomes zero. The Hc abruptly increases around this temperature and hence abruptly decreases outside this temperature. The decreased Hc is cancelled by a relatively weak bias field (Hb). Thus, recording is enabled. This process is called Tcomp. recording (compensation point recording).

In this case, however, there is no need to adhere to the Curie point or temperatures therearound, and the compensation temperature. In other words, if a bias field (Hb) capable of cancelling a decreased Hc is applied to a magnetic material having the decreased Hc at a predetermined temperature higher than a room temperature, recording is enabled.

PRINCIPLE OF READING

FIG. 2 illustrates the principle of data reading based on the magnetooptical effect. Light is an electromagnetic wave with an electromagnetic-field vector normally emanating in all directions in a plane perpendicular to the light path. When light is converted to linearly polarized beams (Lp) and radiated onto a recording layer (1), it is reflected by or passes through the recording layer (1). At this time, the plane of polarization rotates according to the direction of magnetization (M). This phenomenon is called the magnetic Kerr effect or magnetic Faraday effect.

For example, if the plane of polarization of the reflected light rotates through $\theta_k$ degrees for "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by "non-A-direction" magnetized bit ($B_0$) cannot pass through the analyzer. On the contrary, a product $(X \sin 2\theta_k)^2$ of the light reflected by a bit ($B_1$) magnetized along the "A direction" passes through the analyzer and becomes incident on a detector (Photoelectric conversion means). As a result, the bit ($B_1$) magnetized along the "A direction" looks brighter than the bit ($B_0$) magnetized along the "non-A-direction", and the detector produces a stronger electrical signal for the bit ($B_1$). The electrical signal from the detector is modulated in accordance with the recorded data, thus reading the data.

In order to re-use a recorded medium, (i) the medium must be re-initialized by an initializing device, (ii) an erasing head as well as a recording head must be added to a recording apparatus, or (iii) recorded data must be erased using a recording apparatus or an erasing apparatus as preliminary processing.

Therefore, in conventional magnetooptical recording method, an over-write operation, which allows new data recording regardless of the presence/absence of the recorded data, is impossible.

If the direction of a bias field (Hb) can be freely changed between the "A direction" and "non-A direction", an over-write operation is possible. However, the direction of the bias field (Hb) cannot be changed at high speed. For example, when a bias field (Hb) applying means is a permanent magnet, the direction of the magnet must be mechanically reversed In this case, it is impossible to rotate the direction of the magnet at high speed. Similarly, when the bias field (Hb) applying means is an electromagnet, the direction of such a large current cannot be reversed at high speed.

For this reason, a magnetooptical recording medium and a recording method using the same, capable of an over-write operation upon modulation of light without turning on/off a bias field (Hb) or changing the direction of the bias field (Hb) have been developed, and have been disclosed in U.S. Ser. No. 870,350 on Jun. 4, 1986 which was abandoned in favor of continuation-in-part application Ser. No. 090,973 filed Aug. 31, 1987; which was abandoned in favor of continuation application Ser. No. 453,255 filed Dec. 20, 1989 (referred to herein as the "prior application").

According to this prior patent application, there is provided a magnetooptical recording method, in which data is recorded on a recording layer of a magnetooptical recording medium using a bit having upward-magnetization and a bit having downward-magnetization, the method comprising the steps of:

(a) using, as the medium, a multilayered magnetic recording medium consisting of a first layer having a perpendicular magnetic anisotropy acting as a recording layer, and a second layer having a perpendicular magnetic anisotropy acting as a reference layer;

(b) moving said medium;

(c) applying an initial field so that, before recording, the direction of magnetization of the recording layer is left unchanged, and that of the reference layer is aligned either upward or downward;

(d) radiating a laser beam onto the medium;

(e) pulse modulating an intensity of the laser beam in accordance with binary data to be recorded;

(f) when the laser beam is radiated, applying a bias field to the irradiated portion; and (g) when the intensity of the pulse-modulated laser beam is at high level, forming one of the bit having upward-magnetization and that having downward-magnetization, and when the intensity of the pulse-modulated laser beam is at low level, forming the other bit.

With the method of the prior application, the laser beam is pulse modulated based on data to be recorded. However, this procedure itself has been performed in conventional magnetooptical recording method, and a means for pulse modulating the beam intensity based on two-valued or binary data to be recorded is means known means. For example, see "THE BELL SYSTEM TECHNICAL JOURNAL," Vol. 62 (1983) pp. 1923–1936.

A characteristic feature of the prior application lies in high and low levels of the beam intensity. More specifically, when the beam intensity is at high level, "A-directed" magnetization of the reference layer is reversed to the "non-A direction" by means of a bias field (Hb), and a bit having the "non-A-directed" (or "A-directed") magnetization is thus formed in the recording layer by means of the "non-A-directed" magnetization of the reference layer. When the beam intensity is at low level, a bit having the "A-directed" (or "non-A-directed") magnetization is formed in the recording layer by means of the "A-directed" magnetization of the reference layer. If required high and low levels are given, it is easy for a person skilled in the art to modulate the beam intensity according to the prior application only by partially modifying the modulating means.

In this specification, if expressions ooo (or xxx) appear, ooo outside the parentheses in the first expression corresponds to ooo in the subsequent expressions ooo (or xxx), and vice versa.

As is well known, even if recording is not performed, a laser beam is often turned on at very low level* in order to, for example, access a predetermined recording position on the medium. When the laser beam is also used for reading, the laser beam is often turned on at an intensity of the very low level*. In this invention, the intensity of the laser beam may be set at this very low level. However, low level for forming a bit is higher than the very low level*. The output waveform of the laser beam of the prior application is as shown in FIG. 3.

In the prior application, a single beam is used. As described in another prior application, U.S. Ser. No. 104,421 filed on Oct. 5, 1987, now U.S. Pat. No. 4,855,975 issued Aug. 8, 1989, two adjacent beams, i.e., a leading beam of low level and a trailing beam of high level are used. In this application, the leading beam is not modulated in principle, and the trailing beam is modulated in accordance with data, thus allowing an over-write operation. In this case, the trailing beam is pulse-modulated between high level and base level (level equal to or lower than low level. The output waveform in this case is as shown in FIG. 4.

The multilayered magnetooptical recording medium of the prior application includes a first layer having a perpendicular magnetic anisotropy as a recording layer, and a second layer having a perpendicular magnetic anisotropy as a reference layer.

The invention of the prior application is divided into first and second aspects. In both the aspects, the recording medium has a multilayered structure, which is divided into two layers, as shown in FIG. 5A.

The first layer is the recording layer, which exhibits high coercivity at room temperature and has low reversing temperature. The second layer is the reference layer, which exhibits low coercivity at room temperature and has a higher reversing temperature than the first layer. Both the layers comprise perpendicular anisotropy magnetic layers. Note that each of the first and second layers can comprise a multilayered structure. If necessary, a third layer can be interposed between the first and second layers. In addition, a clear boundary between the first and second layers need not be formed, and one layer can be gradually converted into the other layer.

In the first aspect, the coercivity of a recording layer (first layer) is represented by $H_{C1}$; that of a reference layer (second layer) $H_{C2}$; the Curie temperature of the first layer, $T_{C1}$; that of the second layer, $T_{C2}$; the room temperature, $T_R$; the temperature of the recording medium when a low level laser beam is radiated, $T_L$; that when a high level laser beam is radiated, $T_H$, a coupling field applied to the first layer, $H_{D1}$; and a coupling field applied to the second layer, $H_{D2}$. In this case, the recording medium satisfies the following Formula 1, and satisfies Formulas 2 to 5 at the room temperature.

$$T_R<T_{C1}\approx T_L<T_{C2}\approx T_H \quad \text{Formula 1}$$

$$H_{C1}>H_{C2}+|H_{D1}\pm H_{D2}| \quad \text{Formula 2}$$

$H_{C1}>H_{D1}$ Formula 3

$H_{C2}>H_{D2}$ Formula 4

$H_{C2}+H_{D2}<|Hini.|<H_{C1}\pm H_{D1}$ Formula 5

In the above formula, symbol "≈" means "equal to" or "substantially equal to". In addition, of double signs ± and ∓, the upper sign corresponds to an A (antiparallel) type medium, and the lower sign corresponds to a P (parallel) type medium (these media will be described later). Note that the P type medium includes a ferromagnetic material and a magnetostatic coupling medium.

The relationship between the coercivity and the temperature is as shown in the graph of FIG. 6. Referring to FIG. 6, the thin curve represents the characteristics of the first layer and the bold curve represents those of the second layer.

Therefore, when an initial field (Hini.) is applied to the recording medium at room temperature, the direction of magnetization of the second layer is reversed without reversing that of the first layer, according to Formula 5. When the initial field (Hini.) is applied to the recording layer before recording, the second layer can be magnetized in the "A direction" (in the drawings, the "A direction" is indicated by an upward arrow "↑", and the "non-A direction" is indicated by a downward arrow "↓"). If the initial field (Hini.) is decreased to zero, the direction of magnetization "↑" of the second layer can be left unchanged without being re-reversed, according to Formula 4.

FIG. 5B schematically shows a state wherein only the second layer is magnetized in the "A direction" " " immediately before recording.

Referring to FIG. 5B, the direction of magnetization in the first layer represents previously recorded data. Since the direction of magnetization in the first layer 1 does not change the basic operation mechanism, it is indicated by X in the following description. The diagram in FIG. 5B is modified as shown in Condition 1 in FIG. 7 for the sake of simplicity.

In Condition 1, the high-level laser beam is radiated onto the recording medium to increase the medium temperature to $T_H$. Since $T_H$ is higher than the Curie temperature $T_{C1}$, magnetization of the first layer 1 disappears. In addition, since $T_H$ is near the Curie temperature $T_{H2}$, magnetization of the second layer 2 also disappears completely or almost completely. The bias field, (Hb) in the "A direction" or "non-A direction" is applied to the medium in accordance with the type thereof. The bias field (Hb) can be a stray field from the medium itself. For the sake of simplicity, assume that the bias field (Hb) in the "non-A direction" is applied to the medium. Since the medium is moving, a given irradiated portion is immediately separated from the laser beam and is cooled by air. When the temperature of the medium is decreased under the presence of the field Hb, the direction of magnetization of the second layer is reversed to the "non-A, direction" based on the field Hb (Condition $2_H$ in FIG. 7).

When the medium is further cooled and the medium first layer appears again. In this case, the direction of magnetization of the first layer is influenced by that of the second layer due to a magnetic coupling (exchange or magnetostatic coupling) force. As a result, magnetization ↓ (the P type medium) or ↑ (the A type medium) is formed in accordance with the type of the medium, as shown in Condition $3_H$ in FIG. 7.

A change in conditions due to high-level laser beam irradiation is called a high-temperature cycle herein.

Next, in Condition 1 in FIG. 8, the low-level laser beam is radiated onto the medium to increase the medium temperature to $T_L$. Since $T_L$ is near the Curie temperature $T_{C1}$, magnetization of the first layer disappears completely or almost completely. However, since $T_L$ is below the Curie temperature $T_{C2}$, magnetization of the second layer does not disappear (Condition $2_L$ in FIG. 8). In Condition $2_L$, although the bias field (Hb) is unnecessary, it cannot be turned on or off at high speed. Therefore, the bias field (Hb) is left applied inevitably.

However, since the coercivity $H_{C2}$ is maintained high, the direction of magnetization of the second layer will not be reversed due to the field Hb. Since the medium is moving, a given irradiated portion is immediately separated from the laser beam and is cooled by air. As cooling progresses, magnetization of the first layer appears. The direction of magnetization is influenced by that of the second layer due to the magnetic coupling force. As a result, magnetization ↑ (the P type medium) or ↓ (the A type medium) appears in accordance with the type of the medium. This magnetization is not changed even at the room temperature (Condition $3_L$ in FIG. 8).

A change in conditions due to low-level laser beam irradiation is called a low-temperature cycle herein.

FIG. 9 summarizes the above descriptions. Referring to FIG. 9, bits, having either magnetization ↑ or ↓, which are opposite to each other, are formed in the high- and low-temperature cycles regardless of the direction of magnetization in the first layer. More specifically, an over-write operation is enabled by pulse modulating the laser beam between high level (high-temperature cycle) and low level (low-temperature cycle) in accordance with data to be recorded.

Note that the recording medium normally has a disk shape, and is rotated during recording. For this reason, a recorded portion (bit) is again influenced by the initial field (Hini), which is applied by initial field applying means during a single rotation As a result, the direction of magnetization of the second layer is aligned along the original "A direction" ↑ as shown in FIG. 10. However, at the room temperature, magnetization of the second layer can no longer influence that of the first layer, and the recorded data can be held.

If linearly polarized light is radiated onto the first layer, since light reflected thereby includes data, data can be reproduced as in the conventional magnetooptical recording medium.

A perpendicular magnetic anisotropy film constituting the first (recording) layer and the second (reference) layer is selected from the group consisting of (1) crystalline or amorphous ferromagnetic or ferromagnetic materials having a Curie temperature and no compensation temperature, and (2) crystalline or amorphous ferromagnetic materials having both a compensation temperature and a Curie temperature.

The first aspect utilizing the Curie temperature has been described. In contrast to this, the second aspect of the present invention utilizes decreased coercivity $H_C$ at a predetermined temperature exceeding the room temperature The second aspect uses a temperature $T_{S1}$ at which the first layer is magnetically coupled to the second layer, in place of the temperature $T_{C1}$ in the first aspect In addition, instead of the temperature $T_{C2}$, a temperature $T_{S2}$ at which the second layer is reversed under the influence of the field Hb is used. Thereby, the second aspect can provide the same effect as in the first aspect.

In the second aspect, the coercivity of the first layer is represented by $H_{C1}$; that of the second layer, $H_{C2}$; a temperature at which the first layer is magnetically coupled to the second layer, $T_{S1}$; a temperature at which the direction of magnetization of the second layer is reversed upon influence of the field Hb, $T_{S2}$; room temperature, $T_R$; a temperature of the medium when a low-level laser beam is applied thereto, $T_L$; a temperature of the medium when a high-level laser beam is applied thereto; $T_H$, a coupling field applied to the first layer, $H_{D1}$; and a coupling field applied to the second layer, $H_{D2}$. In this case, the recording medium satisfies the following Formula 6, and satisfies Formulas 7 to 10 at the room temperature.

$$T_R<T_{S1}\approx T_L<T_{S2}\approx T_H \quad \text{Formula 6}$$

$$H_{C1}>H_{C2}+|H_{D1}\mp H_{D2}| \quad \text{Formula 7}$$

$$H_{C1}>H_{D1} \quad \text{Formula 8}$$

$$H_{C2}>H_{D2} \quad \text{Formula 9}$$

$$H_{C1}+H_{D2}<|Hini.|<H_{C1}\pm H_{D1} \quad \text{Formula 10}$$

In the above formulas, upper signs of double signs ± and ∓ correspond to an A (antiparallel) type medium, and lower signs correspond to a P (parallel) medium (these media will be described later).

In the first and second aspects, the recording medium is constituted by first and second layers, each of which preferably comprises an amorphous ferromagnetic material selected from transition metal (e.g., Fe, Co)—heavy rare earth metal (e.g., Gd, Tb, Dy, and the like) alloy compositions.

When the first and second layers are both selected from the transition metal - heavy rare earth metal alloy compositions, the direction and level of magnetization appearing outside the alloy are determined by the relationship between the direction and level of spin of transition metal atoms (to be referred to as TM hereinafter) and those of heavy rare earth metal atoms (to be referred to as RE hereinafter) inside the alloy. For example, the direction and level of TM spin are represented by a first vector ↑, those of RE spin are indicated by a second vector ↑, and the direction and level of magnetization of the alloy as a whole are represented by a double-solid vector. In this case, the vector is represented by a sum of spin vectors ↑ and ↑. However, in the alloy, the spin vectors ↑ and ↑ are directed in opposite directions due to the mutual effect of the TM spin and the RE spin. Therefore, when these vectors are equal to each other, the sum of spin vectors ↓ and ↑ is zero (i.e., the level of magnetization appearing outside the alloy is zero). The alloy composition making the sum of vectors zero is called a compensation composition. When the alloy has another composition, it has a strength equal to a difference between the strengths of both the spins, and has a vector (↑ or ↓) having a direction equal to that of the larger spin vector. Magnetization of this vector appears outside the alloy.

When one of the strengths of the vectors of the RM spin and TM spin is larger than the other, the alloy composition is referred to as "oo rich" named after the larger spin name (e.g., RE rich).

The first and second layers can be classified into TM rich and RE rich compositions. Therefore, if the composition of the first layer is plotted along the ordinate and that of the second layer is plotted along the abscissa, the types of the recording media according to the present invention can be classified into four quadrants, as shown in FIG. 11. The P type medium described previously belongs to Quadrant I and III, and the A type medium belongs to Quadrant II and IV. Referring to FIG. 11, the intersection (origin) of the abscissa and the ordinate represents the compensation composition of both the layers.

In view of a change in coercivity with a change in temperatures, a certain alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature (Tcomp.). No compensation temperature is present between the room temperature and the Curie temperature in the TM rich alloy composition. The compensation temperature below the room temperature is irrelevant in magnetooptical recording, and hence, it is assumed in this specification that the compensation temperature is present between the room temperature and the Curie temperature.

If the first and second layers are classified in view of the presence/absence of the compensation temperature, the recording medium can be classified into four types. The recording medium in Quadrant I includes all the four types of media. The graphs of FIGS. 12A to 12D respectively show the relationship between the coercivity and the temperature of the four types of media. Note that thin curves represent characteristics of the first layer and bold curves represent those of second layer.

When the first (recording) layer and the second (reference) layer are classified in view of their RE or TM rich characteristics and in view of the presence/absence of the compensation temperature, they can be classified into 9 classes.

TABLE 1

| Class | First Layer: RE rich | Second Layer: RE rich | Type |
|---|---|---|---|
| | Quadrant I | | |
| 1 | Tcomp. | Tcomp. | 1 |
| 2 | No Tcomp. | Tcomp. | 2 |
| 3 | Tcomp. | No Tcomp. | 3 |
| 4 | No Tcomp. | No Tcomp. | 4 |
| | Quadrant II | | |
| Class | First Layer: RE rich | Second Layer: TM rich | Type |
| 5 | Tcomp. | No Tcomp. | 3 |
| 6 | No Tcomp. | No Tcomp. | 4 |
| | Quadrant III | | |
| Class | First Layer: TM rich | Second Layer: TM rich | Type |
| 7 | No Tcomp. | No Tcomp. | 4 |
| | Quadrant IV | | |
| Class | First Layer: TM rich | Second Layer: RE rich | Type |
| 8 | No Tcomp. | Tcomp. | 2 |
| 9 | No Tcomp. | No Tcomp. | 4 |

However, recording media disclosed in the prior application have a relatively narrow range of formulas allowing an over-write operation, and a medium composition design therefore is rendered relatively difficult.

SUMMARY OF THE INVENTION

It is a first object of the present invention to provide an over write capable magnetooptical recording medium which allows relatively easy composition design.

It is a second object of the present invention to provide an over write capable recording method using the medium.

It is a third object of the present invention to provide an over write capable magnetooptical recording apparatus according to the method described above.

The present inventors made extensive studies, and found that a medium in which the direction of an initial field Hini. is the same as that of a bias field Hb (Classes 1, 2, and 8 in Table 1), and which satisfies predetermined formulas can allow an over-write operation if a jointing field Hini. is used which continuously varies from the initial field Hini. to the bias field Hb, thus achieving the present invention.

More specifically, according to a first aspect of the present invention, there are provided the following recording medium Nos. 1' to 3'.

Medium No. 1'

In a disk-shaped multilayered magnetooptical recording medium consisting of a perpendicular magnetic anisotropy layer structure that is at least a two-layered structure including a first layer serving as a recording layer and a second layer serving as a reference layer, the first layer comprises a transition metal-heavy rare earth alloy which is heavy rare earth rich and has a compensation temperature between a room temperature and a Curie temperature, the second layer comprises a transition metal-heavy rare earth alloy which is heavy rare earth rich and has a compensation temperature between the room temperature and the Curie temperature, and the medium satisfies the following Formula (1):

$$T_R<T_{comp.1}<T_{C1}\approx T_L\approx T_{comp.2}<T_H \quad (1)$$

and satisfies the following Formulas at the room temperature:

$$H_{C1}-\frac{\sigma w}{2M_{S1}t_1} > H_{C2}+\frac{\sigma w}{2M_{S2}t_2} \geqq |Hb| \quad (2)$$

$$H_{C1} > \frac{\sigma w}{2M_{S1}t_1} \quad (3)$$

$$|Hb| > -H_{C2}+\frac{\sigma w}{2M_{S2}t_2} > 0 \quad (4)$$

$$H_{C2}+\frac{\sigma w}{2M_{S2}t_2} < |Hini.| < H_{C1}-\frac{\sigma w}{2M_{S1}t_1} \quad (5)$$

Medium No. 2'

In a disk-shaped multilayered magnetooptical recording medium consisting of a perpendicular magnetic anisotropy layer structure that is at least a two-layered structure including a first layer serving as a recording layer and a second layer serving as a reference layer, the first layer comprises a transition metal-heavy rare earth alloy which is heavy rare earth rich and does not have a compensation temperature between a room temperature and a Curie temperature, the second layer comprises a transition metal-heavy rare earth alloy which is heavy rare earth rich and has a compensation temperature between the room temperature and the Curie temperature, and the medium satisfies the following Formula (1):

$$T_R<T_{C1}\approx T_L\approx T_{comp.2}<T_{C2}\approx T_H \quad (1)$$

and satisfies the following formulas at the room temperature:

$$H_{C1}-\frac{\sigma w}{2M_{S1}t_1} > H_{C2}+\frac{\sigma w}{2M_{S2}t_2} \geqq |Hb| \quad (2)$$

$$H_{C1} > \frac{\sigma w}{2M_{S1}t_1} \quad (3)$$

$$|Hb| > -H_{C2}+\frac{\sigma w}{2M_{S2}t_2} > 0 \quad (4)$$

$$H_{C2}+\frac{\sigma w}{2M_{S2}t_2} < |Hini.| < H_{C1}-\frac{\sigma w}{2M_{S1}t_1} \quad (5)$$

Medium No. 3'

In a disk-shaped multilayered magnetooptical recording medium consisting of a perpendicular magnetic anisotropy layer structure that is at least a two-layered structure including a first layer serving as a recording layer and a second layer serving as a reference layer, the first layer comprises a transition metal-heavy rare earth alloy which is transition metal rich and does not have a compensation temperature between a room temperature and a Curie temperature, the second layer comprises a transition metal-heavy rare earth alloy which is heavy rare earth rich and has a compensation temperature between the room temperature and the Curie temperature, and the medium satisfies the following Formula (1):

$$T_R<T_{C1}\approx T_L\approx T_{comp.2}<T_{C2}\approx T_H \quad (1)$$

and satisfies the following formulas at the room temperature:

$$H_{C1}-\frac{\sigma w}{2M_{S1}t_1} > H_{C2}+\frac{\sigma w}{2M_{S2}t_2} \geqq |Hb| \quad (2)$$

$$H_{C1}-H_{C2} > \frac{\sigma w}{2M_{S1}t_1}-\frac{\sigma w}{2M_{S2}t_2} \quad (2\text{-}2)$$

$$H_{C1} > \frac{\sigma w}{2M_{S1}t_1} \quad (3)$$

$$|Hb| > -H_{C2}+\frac{\sigma w}{2M_{S2}t_2} > 0 \quad (4)$$

$$H_{C2}+\frac{\sigma w}{2M_{S2}t_2} < |Hini.| < H_{C1}-\frac{\sigma w}{2M_{S1}t_1} \quad (5)$$

where $T_R$: room temperature $T_{comp.1}$: compensation temperature of first layer $T_{comp.2}$: compensation temperature of second layer $T_{C1}$: Curie temperature of first layer $T_2$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $M_{S1}$: saturation magnetization of first layer $M_{S2}$: saturation magnetization of second layer $t_1$: thickness of first layer $t_2$: thickness of second layer $\sigma_w$: interface wall energy Hini.: initial field Hb: bias field According to the present invention, there is also provided a magnetooptical recording method for recording data on a recording layer of a magnetooptical recording medium using a bit having upward-magnetization and a bit having downward-magnetization, comprising the steps of:

(a) providing a disk-shaped multilayered magnetooptical recording medium consisting of a perpendicular magnetic anisotropy layer structure that is at least a two-layered structure including a first layer serving as a recording layer and a second layer serving as a reference layer as the medium;

(b) rotating the medium;

(c) applying an initial field so that, before recording, only the direction of magnetization of the second layer of the medium is aligned either upward or downward;

(d) applying, to the medium, a jointing field which varies from the initial field to a bias field having a lower intensity than the initial field;

(e) radiating a laser beam onto the medium;

(f) pulse modulating an intensity of the laser beam in accordance with binary data to be recorded;

(g) applying the bias field to a portion of the medium onto which the laser beam is radiated; and (h) when the intensity of the pulse-modulated laser beam is at high level, forming one of the bit having upward-magnetization and that having downward-magnetization, and when the intensity of the pulse-modulated laser beam is at low level, forming the other bit.

Assuming that the direction of magnetization of only the reference layer is aligned in an "A-direction" as one of upward and downward directions upon application of the initial field, when the intensity of the laser beam is at high level, "A-directed" magnetization is reversed to a "non-A-direction" by means of the bias field, and a bit having "non-A-directed" (or "A-directed") magnetization is formed in the recording layer by means of the "non-A-directed" magnetization of the reference layer; and when the intensity of the laser beam is at low level, a bit having "A-directed" (or "non-A-directed") magnetization is formed in the recording layer by means of "A-directed" magnetization of the reference layer.

Furthermore, according to the present invention, there is provided an over write capable magnetooptical recording apparatus including:

(a) means for rotating a disk-like magnetooptical recording medium;

(b) means for applying a jointing field which continuously varies from an initial field to a bias field having a lower intensity than thin of the initial field;

(c) a laser beam light source; and (d) modulation means for pulse modulating an intensity of a laser beam between (1) high level for, if one of upward and downward directions is given as an "A-direction" and the other direction is given as a "non-A-direction", providing a temperature suitable for forming a bit having "A-directed" magnetization, and (2) low level for providing a temperature suitable for forming a bit having "non-A-directed" magnetization.

Medium No. 1'

The principle of the method of the prior application invention will be described in detail using a specific medium No. 1 belonging to Class 1 (P type, Quadrant I, Type 1) shown in Table 1, and the principle of the method of the present invention will be described in detail using a specific medium No. 1'. The medium No. 1 satisfies Formula 11:

$$T_R<Tcomp.1<T_1\approx T_L\approx Tcomp.2<T_{C2}\approx T_H$$

The graph of FIG. 13 shows this relation Note that thin curves indicate the first layer, and bold curves indicate the second layer. Those identifications are the same in the following graphs.

A condition that reverses the direction of magnetization of the second layer without reversing that of the first layer by the initial field (Hini.) at the room temperature $T_R$ is represented by Formula 12. The medium No. 1 satisfies Formula 12 at the $T_R$.

$$H_{C1}>H_{C2}+(\sigma_w/2M_{S1}t_1)+(\sigma_w/2M_{S2}t_2)$$

where $H_{C1}$: coercivity of first layer $H_{C2}$: coercivity of second layer $M_{S1}$: saturation magnetization of first layer $M_{S2}$: saturation magnetization of second layer $t_1$: film thickness of first layer $t_2$: film thickness of second layer $\sigma_w$: interface wall energy At this time, a condition for the Hini. is represented by Formula 15. If the Hini. disappears (i.e., if a particular region of the medium is no longer influenced by Hini), reversed magnetization of the second layer is influenced by magnetization of the first layer due to an exchange coupling force. The condition that can hold the direction of magnetization of the second layer is represented by Formulas 13 and 14. The medium No. 1 satisfies Formulas 13 and 14.

Formula 13: $H_{C1}>(\sigma_w/2M_{S1}t_1)$

Formula 14: $H_{C2}>(\sigma_w/2M_{S2}t_2)$

Formula 15:

$$H_{C2}+(\sigma_w/2M_{S2}t_2)<|Hini.|<H_{C1}-(\sigma_w/2M_{S1}t_1)$$

The layer 2's magnetization of the recording medium which can satisfy Formulas 12 to 14 at the $T_R$ is aligned along the "A direction") ↑ ↓) by the Hini. which satisfies Formula 15. At this time, the recording layer 1 is maintained in the recorded state (Condition 1 in FIGS. 14 and 15).

Condition 1 is held to a point immediately before the recording. In this case, the bias field (Hb) is applied in the direction of ↑.

The high-temperature cycle will now be described with reference to FIG. 14.

High-Temperature Cycle

In Condition 1, when the medium temperature is increased to $T_L$ upon irradiation of the high-level laser beam, since the temperature $T_L$ is substantially equal to the Curie temperature $T_{C1}$ of the first layer, magnetization of the first layer 1 disappears (Conditions $2_H$).

When the laser-beam radiation further continues the temperature of the medium increases accordingly. When the temperature of the medium slightly exceeds the temperature Tcomp.2 of the second layer, the relationship between the strengths of the vectors is reversed although the directions of the RE and TM spins remain the same. For this reason, the direction of magnetization of the second layer is reversed to be along the "non-A direction" ↓ (Condition $3_H$).

However, since the coercivity $H_{C2}$ is still high at this temperature, the direction of magnetization of the second layer will not be reversed by the field Hb (↑). When the temperature further increases and reaches the temperature $T_H$, the temperature of the second layer substantially corresponds to the Curie temperature $T_{C2}$, and magnetization of the second layer also disappears (Condition $4_H$).

In Condition $4_H$, when an, irradiated portion is separated from the laser beam spot, the temperature of the medium begins to decrease. When the temperature of the medium decreases slightly below the temperature $T_{C2}$, magnetization appears in the second layer. In this case, magnetization ↑ (↓ ↑) is generated by ↑ Hb (Condition $5_H$). However, since the temperature is yet higher than the temperature $T_{C1}$, no magnetization appears in the first layer.

When the temperature of the medium further decreases below the temperature Tcomp.2 the relationship between the strengths of the spin vectors is reversed although the directions of the RE and TM spins remain the same As a result, the direction of magnetization of the alloy as a whole is reversed from to the "non-A direction" ↓ (Condition $6_H$).

In Condition $6_H$, since the temperature of the medium is higher than the temperature $T_{C1}$, magnetization of the first layer has not yet appeared In addition, since the coercivity $H_{C2}$ at this temperature is high, the direction of magnetization of the second layer cannot be reversed by the field ↑ Hb.

When the temperature of the medium decreases and is slightly below the temperature $T_{C1}$, magnetization appears in the first layer. At this time, the exchange coupling force from the second layer acts to align each of the RE and TM spins (↓ and ↑) of the first and second layers. Since the temperature of the first layer is higher than the temperature Tcomp.1, the TM spin is larger than the RE spin, and hence, magnetization of ↓ ↑, i.e., ↑ appears in the first layer. This state is Condition $7_H$.

When the temperature of the medium is decreased from the temperature in Condition $7_H$ and is below the temperature Tcomp.1, the relationships between the strengths of the RE and TM spins of first layer is reversed. As a result, magnetization of ↓ appears (Condition $8_H$).

Then, the temperature of the medium decreases from the temperature in Condition $8_H$ to the room temperature. Since the coercivity $H_{C1}$ at the room temperature is sufficiently high, Condition $8_H$ is maintained without reversing the direction of magnetization of the first layer by the field ↑ Hb. In this way, bit formation in the "non-A-direction" is completed.

Next, the low-temperature cycle will be described with reference to FIG. 15.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the first layer, magnetization of the first layer disappears (Condition $2_L$).

In Condition $2_L$), when an irradiated portion is separated from the laser beam spot, the medium temperature begins to fall. When the medium temperature is slightly below the temperature $T_{C1}$, the first layer is influenced by the RE and TM spins (↑ ↓) of the second layer due to the exchange coupling force. In other words, the exchange coupling force acts to align each of the RE and TM spins (↑ and ↓) of the first and second layers As a result, magnetization of ↑ ↓, i.e., ↓, without regard to the bias field ↑ Hb, appears in the first layer (Condition $3_L$). Since the temperature in Condition $3_L$ is higher than the temperature Tcomp.1, TM spin is larger than the RE spin.

When the medium temperature is decreased below the temperature Tcomp.1, the relationship between the RE and TM spins of the first layer is reversed in the same manner as in the high-temperature cycle. As a result, the magnetization of the first layer is ↑ (Condition $4_L$).

Condition $4_L$ is maintained even if the medium temperature is decreased to the room temperature. In this way, bit formation in the "A direction" ↑ is completed.

In this manner, a "non-A-directed" ↓ bit is formed by the high-temperature cycle and an "A-directed" ↑ bit is formed by the low-temperature cycle regardless of previous data. Therefore, when a laser beam is pulse modulated between high and low levels in accordance with binary data to be newly recorded, new data can be recorded. That is, an over-write operation can be achieved.

When a disk-shaped medium is used, the medium is subjected to recording in its peripheral direction while being rotated, as has been described above. For this reason, if an initial field applying means is mounted in a recording apparatus (as is convenient), newly recorded data is subjected to an initial field Hini. again during single rotation of the disk, and the direction of magnetization of the second layer is aligned in the "A-direction". As a result, the data recorded in the second layer disappears, and is left in only the first layer.

More specifically, as shown in FIG. 16, when the direction of magnetization of the second layer is aligned in the "A-direction" ↑ by the initial field Hini., in the case of a P-type medium, a magnetic wall (indicated by —) is formed between the first and second layers in a portion of a bit having "non-A-directed" ↓ magnetization, and this state is rather unstable. Therefore, if the influence of the initial field Hini. disappears, this state tends to be changed to an original stable state: ↓. For this reason, the medium No. 1 must satisfy the conditions of Formulas 13 and 14.

However, in the present invention, since a jointing field Hjoint. jointing the initial field Hini. and the bias field. Hb (see FIG. 17):

$$|Hb| \leqq |H_{joint.}| \leqq |Hini.| \text{ for } |Hb| \neq |Hini|$$

is used, the second layer is protected by the field Hjoint. until recording starts, and there is no fear of changing the state to an original stable state.

Therefore, a medium which is not applicable in the prior application can be used according to the present invention. In particular, Formula 14-2 represents this fact (in the case of the medium No. 1'), and does not repeat Formula 14 in the prior application.

The medium No. 1' of the present invention will be described hereinafter in detail.

The medium No. 1' of the present invention belongs to a Class 1 recording medium (P-type, Quadrant I, Type 1 shown in Table 1.

The medium No. 1' has a relation given by Formula 11:

$$T_R < Tcomp.1 < T_{C1} \approx T_L \approx Tcomp.2 < T_{C2} \approx T_H$$

The graph of FIG. 13 shows this relation.

A condition that reverses the direction of magnetization of only the second layer without reversing that of the first layer by the initial field Hini. at a temperature $T_R$ is represented by Formula 12-2. The medium No. 1' satisfies Formula 12-2:

$$H_{C1} - \frac{\sigma w}{2M_{S1}t_1} > H_{C2} + \frac{\sigma w}{2M_{S2}t_2} \geqq |Hb| \qquad \text{Formula 12-2}$$

A condition for the field Hini. is represented by Formula 15. If the influence of the field Hini. disappears, reversed magnetization of the second layer is influenced by magnetization of the first layer due to an exchange coupling force. The condition that can hold the direction of magnetization of the second layer is represented by Formulas 13 to 14-2. The medium No. 1' satisfies Formulas 13 to 14-2:

$$H_{C1} > \frac{\sigma w}{2M_{S1}t_1} \quad \text{Formula 13}$$

$$|Hb| > H_{C2} + \frac{\sigma w}{2M_{S2}t_2} > 0 \quad \text{Formula 14-2}$$

$$H_{C2} + \frac{\sigma w}{2M_{S2}t_2} < |Hini.| < H_{C1} - \frac{\sigma w}{2M_{S1}t_1} \quad \text{Formula 15}$$

The second layer's magnetization of the recording medium which can satisfy Formulas 12 to 14-2 at the room temperature is aligned along the "A direction" ↑ (↑ ↓) by the field Hini. which satisfies the condition of Formula 15 to a point immediately before recording. At this time, the first layer is maintained in the recorded state (Condition 1 in FIG. 18).

Condition 1 is held to a point immediately before recording upon protection of the field Hjoint. In this case, the bias field (Hb) is applied in the direction of ↑.

High Temperature Cycle

The description with reference to the medium No. 1 of the prior application applies to this.

Low Temperature Cycle

The description with reference to the medium No. 1 of the prior application applies to this.

In this manner, a "non-A-directed" ↓ bit is formed by the high temperature cycle, and an "A-directed" ↑ bit is formed by the low temperature cycle regardless of the previously recorded data. Thus, when a laser beam is pulse modulated between high and low levels in accordance with binary data to be newly recorded, new data can be recorded. That is, an over-write operation can be achieved.

As described in connection with another prior application, a laser beam is divided into two adjacent beams, 65 i.e., primary and secondary beams. The primary beam is kept on at low level to perform erasure, and the secondary beam is pulse modulated between high level and base level in accordance with data, thus achieving an over-write operation (this applies to medium Nos. 2' and 3' to be described later).

When a disk-shaped medium is used, as has been described with reference to the medium No. 1, newly recorded data is subjected to the initial field Hini. again during a single rotation of the disk, and the direction of magnetization of the second layer is aligned along the "A-direction". As a result, the data in the second layer disappears, and data is left in only the first layer, as shown in FIG. 19.

However, the medium used in this invention does not satisfy Formula 14. Therefore, when a medium recorded with new data is unloaded from the recording apparatus or when the influence of the jointing field applying means is reduced to zero so that the medium is free from the influence (or protection) of the magnetic field higher than Hb, magnetization of the first layer influences that of the second layer according to Formula 14-2, and the direction of magnetization of the second layer follows that of the first layer. More specifically, in the case of the P-type medium, in a portion where the first layer has a "non-A-directed", ↓ bit, the second layer also has a "non-A-directed" ↓ bit. Thus, the magnetic wall (indicated by—) between the first and second layers disappears, and a stable state: ↓ ↓ is recovered.

FIG. 20 shows a state when the influence of the field Hjoint. disappears after recording.

As a result, since new data is kept recorded in both the first and second layers, a reproduction beam can be radiated onto either layer, and data is reproduced from a beam reflected thereby. In general, a magnetic material constituting the second layer has a larger θ than that of the first layer. In this case, data is preferably reproduced from the second layer.

Medium No. 2'

The principle of the method of the prior application invention will be described in detail using a specific medium No. 2 belonging to Class 2 (P type, Quadrant I, Type 2) shown in Table 1, and the principle of the method of the present invention will be described in detail using a specific medium No. 2'.

The medium No. 2 satisfies Formula 16:

$$T_R < T_{C1} \approx T_L \approx T_{comp.2} < T_{C2} \approx T_H$$

The graph of FIG. 21 shows this relation.

A condition that reverses the direction of magnetization of the second layer without reversing that of the first layer by the initial field (Hini.) at the room temperature. $T_R$ is represented by Formula 17. The medium No. 2 satisfies Formula 17 at the $T_R$:

$$H_{C1} > H_{C2} + (\sigma_w/2M_{S1}t_1) + (\sigma_2/2M_{S2}t_2)$$

where $H_{C1}$: coercivity of first layer $H_{C2}$: coercivity of second layer $M_{S1}$: saturation magnetization of first $M_{S2}$: saturation magnetization of second layer $t_1$: film thickness of first layer $t_2$: film thickness of second layer $\sigma_w$: interface wall energy A condition for the Hini. is represented by Formula 20. If the influence of Hini. disappears, reversed magnetization of the second layer is influenced by magnetization of the first layer due to an exchange coupling force. The condition that can hold the direction of magnetization of the second layer is represented by Formulas 18 and 19. The medium No. 2 satisfies Formulas 18 and 19.

Formula 18: $H_{C1} > (\sigma_w/2M_{S1}t_1)$

Formula 19: $H_{C2} > (\sigma_w/2M_{S2}t_2)$

Formula 20: $H_{C2} + (\sigma_2/2M_{/S2}t_2) < |Hini.| < H_{C1} - (\sigma_w/2M_{S1}t_1)$ The second layer's magnetization of the recording medium which can satisfy Formulas 17 to 19 at the $T_R$ is aligned along the "A direction" (↑ ↓) by the Hini. which satisfies Formula 20. At this time, the first layer is maintained in the recorded state (Condition 1 in FIGS. 22 and 23).

Condition 1 is held to a point immediately before the recording. In this case, the bias field (Hb) is applied in the direction of ↑.

The high-temperature cycle will now be described with reference to FIG. 22.

High-Temperature Cycle

In Condition 1, when the medium temperature is increased to $T_L$ upon irradiation of the high-level laser beam, since the temperature $T_L$ is substantially equal to the Curie temperature $T_{C1}$ of the first layer, magnetization the first layer disappears (Condition $2_H$).

When the laser-beam radiation further continues, the temperature of the medium increases accordingly. When the temperature of the medium slightly exceeds the temperature Tcomp.2 of the second layer, the relationship between the strengths of spin vectors is reversed although the directions of the RE and TM spins remain the same. For this reason, the direction of magnetization of the second layer is reversed to the "non-A-direction" ↓ (Condition $3_H$).

However, since coercivity $H_{C2}$ is still high at this temperature, the direction of magnetization of the second layer will not be reversed by the field Hb(↑). When the temperature further increases and reaches the temperature $T_H$, the temperature of the second layer substantially corresponds to the Curie temperature $T_{C2}$, and magnetization of the second layer also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization appears in the second layer. In this case, magnetization ↑ (↓ ↑) is generated in the second layer by ↑ Hb (Condition $5_H$). However, since the temperature is yet higher than the temperature $T_{C1}$, no magnetization appears in the first layer.

When the temperature of the medium further decreases below the temperature Tcomp.2, the relationship between the strengths of the spin vectors is reversed although the directions of the RE and TM spins remain the same. As a result, the direction of magnetization of the alloy as a whole is reversed from to the "non-A direction" ↓ (Condition $6_H$).

In Condition $6_H$, since the temperature of the medium is higher than the temperature $T_{C1}$, magnetization of the first layer has not yet appeared. In addition, since the coercivity $H_{C2}$ at this temperature is high, the direction of magnetization of the second layer cannot be reversed by the field ↑ Hb.

When the temperature of the medium decreases and is slightly below the temperature $T_{C1}$, magnetization appears in the first layer. At this time, the exchange coupling force from the second layer acts to align each of the RE and TM spins (↓ and ↑) of the first and second layers. Thus, magnetization of ↓ ↑, i.e., ↓ appears in the first layer. This state is Condition $7_H$.

Then, the temperature of the medium decreases from the temperature in Condition $7_H$ to the room temperature. Since the coercivity $H_{C1}$ at the room temperature is sufficiently high, Condition $7_H$ is maintained without reversing the direction of magnetization of the first layer by the field ↑ Hb. In this way, bit formation in the "non-A direction" is completed.

Next, the low-temperature cycle will be described with reference to FIG. 23.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the first layer, magnetization of the first layer disappears (Condition $2_L$).

In Condition $2_L$, when an irradiated portion is separated from the laser beam spot, the medium temperature begins to fall. When the medium temperature is slightly below the temperature $T_{C1}$, the first layer is influenced by the RE and TM spins (↑ ↓) of the second layer due to the exchange coupling force. In other words, the exchange coupling force acts to align each of the RE and TM spins (↑ and ↓) of the first and second layers. As a result, magnetization of ↓ ↑, e.g., ↑, appears in the first layer (Condition $3_L$).

Condition $3_L$ is maintained even if the medium temperature is decreased to the room temperature. As a result, a bit in the "A direction" is formed in the first layer.

In this manner, a "non-A-directed" ↑ bit is formed by the high temperature cycle, and an "A-directed" bit is formed by the low temperature cycle regardless of the previously recorded data. Thus, when a laser beam is pulse modulated between high and low levels in accordance with binary data to be newly recorded, new data can be recorded. That is, an over-write operation can be achieved.

When a disk-shaped medium is used, as has been described with reference to the medium No 1, the direction of magnetization of the second layer is aligned along the "A-direction" during a single rotation of the disk. As a result, the data in the second layer is erased, and the data is left in only the first layer. Therefore, when the influence of the field Hini. disappears, an original stable state may be undesirably set. In order to prevent this, the medium No. 1 must satisfy conditions of Formulas 18 and 19.

However, in the present invention, since the jointing field Hjoint (see FIG. 17) jointing Hini and Hb is used, the second layer is protected by the field Hjoint. to a point immediately before the recording, and there is no fear of changing the state to an original stable state.

Therefore, a medium which is not applicable in the prior application can be used according to the present invention. In particular, Formula 19-2 (in the case of the medium No. 2') represents this, and does not repeat Formula 19 in the prior application.

The medium No. 2' of the present invention will be described hereinafter in detail.

The medium No. 2' of the present invention belongs to a Class 2 recording medium (P-type. Quadrant I, Type 2) shown in Table 1. The medium No. 2' has a relation given by Formula 16:

$$T_R < T_{C1} \approx T_L \approx \text{Tcomp.2} < T_{C2} \approx T_H \quad \text{Formula 16}$$

The graph of FIG. 21 shows this relation.

A condition that reverses the direction of magnetization of only the second layer without reversing that of the first layer by the initial field Hini. at a temperature $T_R$ is represented by Formula 17-2. The medium No. 2' satisfies Formula 17-2:

$$H_{C1} - \frac{\sigma w}{2M_{S1}t_1} > H_{C2} + \frac{\sigma w}{2M_{S2}t_2} \geqq |Hb| \quad \text{Formula 17-2}$$

A condition for the field Hini. is represented by Formula 20. If the influence of the field Hini. disappears, reversed magnetization of the second layer is influenced by magnetization of the first layer due to an exchange coupling force. The condition that can hold the direction of magnetization of the second layer is represented by Formulas 18 to 19-2. The medium No. 2' satisfies Formulas 18 to 19-2:

$$H_{C1} > \frac{\sigma w}{2M_{S1}t_1} \quad \text{Formula 18}$$

$$|Hb| > -H_{C2} + \frac{\sigma w}{2M_{S2}t_2} > 0 \quad \text{Formula 19-2}$$

-continued $$H_{C2}+\frac{\sigma w}{2M_{S2}t_2}<|Hini.|<H_{C1}-\frac{\sigma w}{2M_{S1}t_1} \quad \text{Formula 20}$$

The second layer's magnetization of the recording medium which can satisfy Formulas 17 to 19-2 at the room temperature is aligned along the "A direction" (↑ ↓) by the field Hini. which satisfies the condition of Formula 15 to a point immediately before recording. At this time, the first layer is maintained in the recorded state (in the same manner as in FIG. 18).

Condition 1 is held to a point immediately before the recording upon protection of the field Hjoint. In this case, the bias field (Hb) is applied in the direction of ↑.

High Temperature Cycle

The description with reference to the medium No. 2 of the prior application applies to this.

Low Temperature Cycle

The description with reference to the medium No. 2 of the prior application applies to this.

In this manner, a "non-A-directed" ↓ is formed by the high temperature cycle, and an "A-directed" ↑ bit is formed by the low temperature cycle regardless of the previously recorded data. Thus, when a laser beam is pulse modulated between high and low levels in accordance with binary data to be newly recorded, new data can be recorded. That is, an over-write operation can be achieved.

In the present invention, since a disk-shaped medium is used, as has been described with reference to the medium No. 2, newly recorded data is subjected to the initial field Hini. again during a single rotation of the disk, and the direction of magnetization of the second layer is aligned along the "A-direction" ↑. As a result, the data in the second layer disappears, and data is left in only the first layer in the same manner as in FIG. 19.

However, the medium used in this invention does not satisfy Formula 19. Therefore, when a medium recorded with new data is unloaded from the recording apparatus or when the influence of the H joint applying means is reduced to zero so that the medium is free from the influence (or protection) of the magnetic field higher than Hb, magnetization of the first layer influences that of the second layer according to Formula 19-2, and the direction of magnetization of the second layer follows that of the first layer. More specifically, in the case of the P-type medium, in a portion where the first layer has a "non-A-directed" ↓ bit, the second layer also has a "non-A-directed" ↓ bit. Thus, the magnetic wall (indicated by between the first and second layers disappears, and a stable state: ↓ ↓ is set.

When the of the field Hjoint. disappears after recording, the same state as in FIG. 20 is established.

As a result., since new data is kept recorded in both the first and second layers, a reproduction beam can be radiated onto either layer, and data can be reproduced from a beam reflected thereby. In general, a magnetic material constituting the second layer has a larger $\theta_k$ than that of the first layer. In this case, data is preferably reproduced from the second layer.

Medium No. 3'

The principle of the method of the prior application invention will be described in detail using a specific medium No. 8 belonging to Class 8 (A type, Quadrant IV, Type 2) shown in Table 1, and the principle of the method of the present invention will be described in detail using a specific medium No. 3'.

The medium No. 8 satisfies Formula 21:

$$T_R(T_{C1}\approx T_L\approx Tcomp.2<(T_{C2}\approx T_H$$

The graph of FIG. 24 shows this relation.

A condition that reverses the direction of magnetization of the second layer without reversing that of the first layer by the initial field (Hini.) at the room temperature $T_R$ is represented by Formula 22. The medium No. 8 satisfies Formula 22 at the $T_R$:

$$H_{C1}<H_{C2}+|(\sigma_w/2M_{S1}t_1)-(\sigma_w/2M_{S2}t_2)$$

where $H_{C1}$: coercivity of first layer $H_{C2}$: coercivity of second layer $M_{S1}$: saturation magnetization of first layer $M_{S2}$: saturation magnetization of second layer $t_1$: film thickness of first layer $t_2$: film thickness of second layer $\sigma_w$: interface wall energy A condition for the Hini. is represented by Formula 25. If the influence of Hini. disappears, reversed magnetization of the second layer is influenced by magnetization of the first layer due to an exchange coupling force. The condition that can hold the direction of magnetization of the second layer is represented by Formulas 23 and 24. The medium No. 8 satisfies Formulas 23 and 24.

Formula 23: $H_{C1}>(\sigma_w/2M_{S1}t_1)$

Formula 24: $H_{C2}>(\sigma_w/2M_{S2}t_2)$

Formula 25: $H_{C2}+(\sigma_w/2M_{S2}t_2)>(\sigma_w/2M_{S1}t_1)$

The second layer's magnetization of the recording medium which can satisfy Formulas 22 to 24 at the $T_R$ is aligned along the "A direction" ↑ (↑ ↓) by the Hini. which satisfies Formula 25. At this time the first layer is maintained in the recorded state (Condition 1 in FIGS. 25 and 26).

Condition 1 is held to a point immediately before the recording. In this case, the bias field (Hb) is applied in the direction of ↑.

The high-temperature cycle will now be described with reference to FIG. 25.

High-Temperature Cycle

In Condition 1, when the medium temperature is increased to $T_L$ upon irradiation of the high-level laser beam, since the temperature $T_L$ is substantially equal to the Curie temperature $T_{C1}$ of the first layer, magnetization of the first layer disappears (Condition $2_H$).

When the laser-beam radiation continues and the medium temperature is slightly higher than the temperature Tcomp.2, the relationship between the strengths of the RE and TM spins is reversed although the directions thereof (↑ and ↓) remain the same. As a result, the direction of the magnetization of the second layer is reversed to "non-A direction" ↓. This state is Condition $3_H$.

At this temperature, however, since the coercivity $H_{C2}$ is yet high, magnetization ↓ of the second layer will not be reversed by the bias field ↑ Hb. Assume that the laser-beam radiation further continues and the medium temperature is increased to $T_H$. Since the temperature $T_H$ is substantially equal to the temperature $T_{C2}$, magnetization of the second layer also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization of the second layer appears. In this case, magnetization (↑ ↓) is generated by ↑ Hb. However, since the temperature is yet higher than the temperature $T_{C1}$, no magnetization appears in the first layer. This state is Condition $5_H$.

When the temperature of the medium is further decreased slightly below the temperature Tcomp.1, the relationship between the strengths of the RE and TM spins is reversed without reversing the directions thereof (↓ and ↑). As a result, the direction of magnetization of the second layer is reversed to "non-A direction". In this state, since the coercivity $H_{C2}$ is already sufficiently high, magnetization ↓ of the second layer will not be reversed by bias field ↑ Hb. In this case, since the medium temperature is yet higher than the temperature $T_{C1}$, no magnetization appears in the first layer. This state is Condition $6_H$.

When the medium temperature further decreases slightly below the temperature $T_{C1}$, magnetization also appears in the first layer. At this time, magnetization (↓ ↑) of the second layer influences the first layer due to the exchange coupling force to align each of the RE and TM spins (↓ and ↑) of the first and second layers For this reason, magnetization, i.e., appears in the first layer (Condition $7_H$).

Then, the temperature of the medium decreases from the temperature in Condition $7_H$ to the room temperature. Since the coercivity $H_{C1}$ at the room temperature is sufficiently high, magnetization of the first layer is stably maintained. In this way, bit formation in the "A direction" is completed.

Next, the low-temperature cycle will be described with reference to FIG. 26.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the first layer, magnetization of the first layer disappears. In this state, however, since the coercivity $H_{C2}$ of the second layer is sufficiently high, magnetization of the second layer will not be reversed by the bias field ↑ Hb (Condition $2_L$).

In Condition $2_L$, when an irradiated portion is separated from the laser beam spot, the medium temperature begins to fall. When the medium temperature is slightly below the temperature $T_{C1}$, the respective spins of the first layer are influenced by the RE and TM spins (↑ ↓) of the second layer due to the exchange coupling force. In other words, the exchange coupling force acts to align each of the RE and TM spins (↑ and ↓) of the first and second layers. As a result, magnetization of ↑ ↓, i.e., without regard to the bias field ↑ Hb, appears in the first layer 1. This state is Condition $3_L$.

Condition $3_L$ is maintained even if the medium temperature is decreased to the room temperature. In this way, bit formation in the "non-A direction" is completed.

In this manner, an "A-directed" bit is formed in the first layer by the high tempera cycle, and a "non-A-directed" bit is formed in the first layer by the low temperature cycle regardless of the previously recorded data. Thus, when a laser beam is pulse modulated between high and low levels in accordance with binary data to be newly recorded, new data can be recorded. That is, an over-write operation can be achieved.

When a disk-shaped medium is used, as has been described with reference to the medium No. 1, the direction of magnetization of the second layer is aligned along the "A-direction" during a single rotation of the disk. As a result, the data in the second layer is erased, and the data is left in only the first layer. Therefore, when the influence of the field Hini. disappears, an original stable state may be undesirably set. In order to prevent this, the medium No. 8 must satisfy conditions of Formulas 23 and 24.

However, in the present invention, since the jointing field Hjoint. (see FIG. 17) jointing Hini. and Hb is used, the second layer is protected by the field Hjoint. to a point immediately before the recording, and there is no fear of changing the state to an original stable state.

Therefore, a medium which is not applicable in the prior application can be used according to the present invention. In particular, Formula 24-2 (in the case of the medium No. 3' represents this, and does not repeat Formula 24 in the prior application.

The medium No. 3' of the present invention will be described hereinafter in detail.

The medium No. 3' of the present invention belongs to a Class 8 recording medium (A-type, Quadrant IV, Type 2) shown in Table 1.

The medium No. 3' has a relation given by Formula 21:

$$T_R < T_{C1} \approx T_L \approx T_{comp.2} < T_{C2} \approx T_H \quad \text{Formula 21}$$

The graph of FIG. 24 shows this relation.

A condition that reverses the direction of magnetization of only the second layer without reversing that of the first layer by the initial field Hini. at a temperature $T_R$ is represented by Formulas 22-2 and 22-3. The medium No. 3' satisfies Formulas 22-2 and 22-3:

$$H_{C1} + \frac{\sigma w}{2M_{S1}t_1} > H_{C2} + \frac{\sigma w}{2M_{S2}t_2} \geqq |Hb| \quad \text{Formula 22-2}$$

$$H_{C1} - H_{C2} > \frac{\sigma w}{2M_{S1}t_1} - \frac{\sigma w}{2M_{S2}t_2} \quad \text{Formula 22-3}$$

A condition for the field Hini. is represented by Formula 25. If the field Hini. disappears, reversed magnetization of the second layer is influenced by magnetization of the first layer due to an exchange coupling force. The condition that can hold the direction of magnetization of the second layer is represented by Formulas 23 to 24-2. The medium No. 3' satisfies Formulas 23 to 24-2:

$$H_{C1} > \frac{\sigma w}{2M_{S1}t_1} \quad \text{Formula 23}$$

$$|Hb| > -H_{C2} + \frac{\sigma w}{2M_{S2}t_2} > 0 \quad \text{Formula 24-2}$$

$$H_{C2} + \frac{\sigma w}{2M_{S2}t_2} < |Hini.| < H_{C1} - \frac{\sigma w}{2M_{S1}t_1} \quad \text{Formula 25}$$

The second layer's magnetization of the recording medium which can satisfy Formulas 22 to 24-2 at the room temperature is aligned along the "A direction" (↑ ↓) by the field Hini. which satisfies the condition of Formula 25 to a point immediately before recording. At this time, the first layer is maintained in the recorded state (in the same manner as in FIG. 18). Condition 1 is held to a point immediately before the recording upon protection of the field Hjoint. In this case, the bias field (Hb) is applied in the direction of ↑.

High Temperature Cycle

The description with reference to the medium No. 8 of the prior application applies to this.

Low Temperature Cycle

The description with reference to the medium No. 8 of the prior application applies to this.

In this manner, an "A-directed" bit is formed in the first layer by the high temperature cycle, and a "non-A-directed" bit is formed by the low temperature cycle regardless of the previously recorded data. Thus, when a laser beam is pulse modulated between high and low levels in accordance with binary data to be newly recorded, new data can be recorded. That is, an overwrite operation can be achieved.

In the present invention, since a disk-shaped medium is used, as has been described with reference to the medium No. 8, newly recorded data is subjected to the initial field Hini. again during a single rotation of the disk, and the direction of magnetization of the second layer is aligned along the "A-direction" . As a result, the data in the second layer disappears, and data is left in only the first layer, as shown in FIG. 27.

However, the medium used in this invention does not satisfy Formula 49. Therefore, when a medium recorded with new data is unloaded from the recording apparatus or when the influence of the jointing field applying means is reduced to zero so thin the medium is free from the influence (or protection) of the magnetic field higher than Hb, magnetization of the first layer influences that of the second layer according to Formula 19-2, and the direction of magnetization of the second layer follows that of the first layer. More specifically, in the case of the P-type medium, in a portion where the first layer has an "A-directed" bit, the second layer also has a "non-A-directed" bit. Thus, the magnetic wall (indicated by—) between the first and second layers disappears, and a stable state: is set.

When the influence of the Hjoint. disappears after recording, a state shown in FIG. 28 is .established.

As a result, since new data is kept recorded in both the first and second layers, a reproduction beam can be radiated onto either layer, and data can be reproduced from a beam reflected thereby. In general, a magnetic material constituting the second layer has a larger $\theta_k$ than that of the first layer. In this case, data is preferably reproduced from the second layer.

Note that if the medium Nos. 1' to 3' accidentally encounter an external field $H_{ot}$ such as a leakage field, a condition that can hold data in the second layer is:

If the field Hjoint is positive:

$$-H_{C2}-\frac{\sigma w}{2M_{S2}t_2}<H_{ot}<-H_{C2}+\frac{\sigma w}{2M_{S2}t_2}$$

If the field $H_{joint}$, is negative:

$$H_{C2}-\frac{\sigma w}{2M_{S2}t_2}<H_{ot}<H_{C2}+\frac{\sigma w}{2M_{S2}t_2}$$

Attention must be paid to the external field $H_{ot}$.

DETAILED DESCRIPTION OF THE PREFERRED EMBODIMENTS

Figure 1:
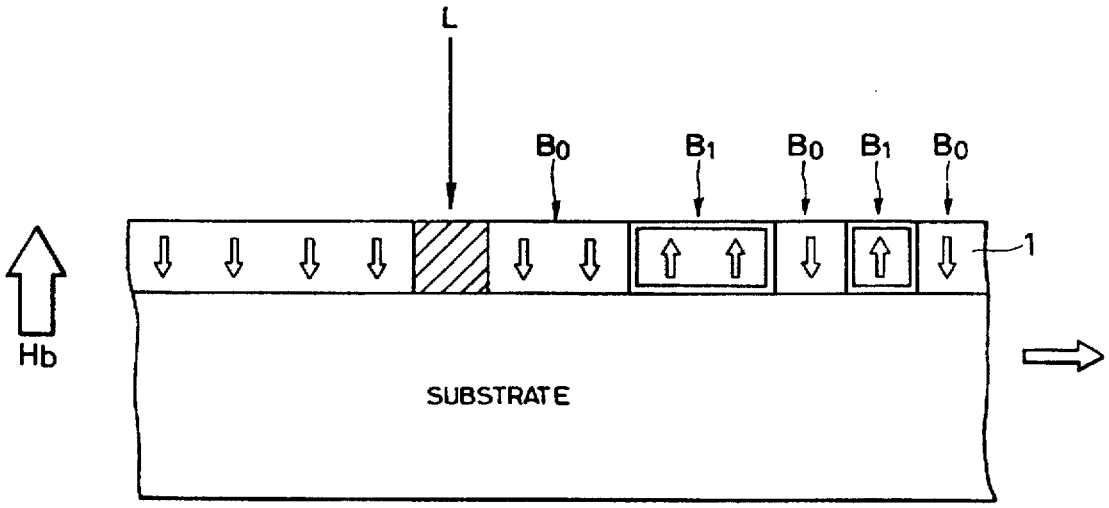
FIG. 1 is an illustration for explaining a recording principle of a magnetooptical recording method.
Figure 2:
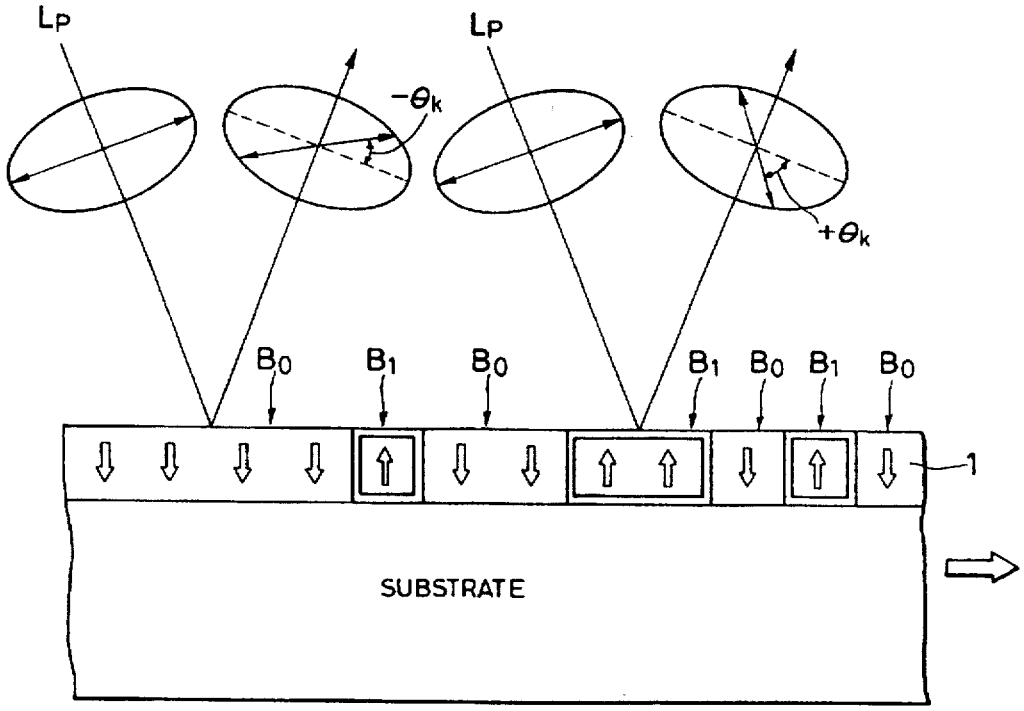
FIG. 2 is an illustration for explaining a reading principle of the magnetooptical recording method.
Figure 3:
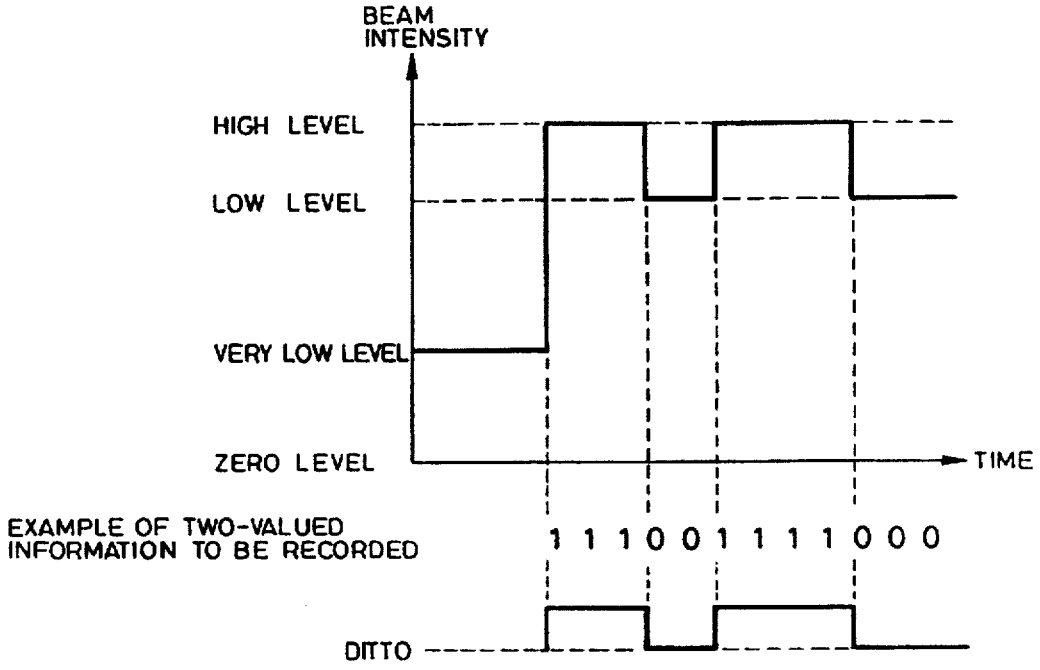
FIGS. 3 and 4 are charts showing an output waveform of laser beams.

The present invention will now be described by way of examples. However, the present invention is not limited to the following examples.

EXAMPLE 1

One of Media No. 1'

A disk-shaped glass substrate was prepared having a thickness of 1.2 mm and a diameter of 200 mm and in which a large number of grooves each having a depth of 1,100 Å and a pitch of 1.6 μm were formed.

A vacuum vapor deposition apparatus was used in this example. It included two crucibles as evaporation sources shown in Table 2 and two units for heating the respective sources with an electron beam.

The glass substrate was placed inside a chamber of the apparatus. The chamber of the apparatus was temporarily evacuated to a vacuum of $1\times10^{-6}$ Torr. or less. Thereafter, deposition was performed at a deposition rate of about 3 Å/sec while maintaining the chamber at a vacuum of 1 to $2\times10^{-6}$ Torr. Then, a 500-Å first layer (recording layer) of $Gd_{14}Dy_{12}Fe_{74}$ (note: appendixes, atom. %) was formed on the substrate. Subsequently, the evaporation sources were exchanged while maintaining the vacuum state. Then, deposition was performed again to form a 505-Å thick second layer (reference layer) of $Gd_{22}Tb_6Fe_{72}$.

The first and second layers were perpendicular anisotropy magnetic layers.

In this way, a double-layered recording medium No. 1' belonging to Class 1 (i.e., P-type, Quadrata I, and Type 1) was manufactured.

Table 2 below shows the manufacturing conditions and characteristics of the medium No. 1'.

TABLE 2

| | first layer | second layer |
|---|---|---|
| Evaporation Source (2 Elements) | GdDy alloy Fe | GdTb alloy Fe |
| Film Thickness (Å) | 500 | 505 |
| Ms (emu/cc) | 100 | 110 |
| Hc (oe) | 5600 | 1200 |
| Tc (°C.) | 150 | 210 |
| Tcomp (°C.) | 110 | 180 |
| $\sigma_w$ (Room Tempenture) | 1.5 erg/cm$^2$ | |

If $T_L$=160° C., $T_H$=220° C., Hini=3,000 Oe and Hb=300 Oe, this medium satisfies:

$$T_R<Tcomp.1<T_{C1}\approx T_L\approx Tcomp.2<T_{C2}\approx T_H$$

and Formula 12-2:

$$H_{C1}-(\sigma_w/2M_{S1}t_1) = 4{,}000\ \text{Oe} > H_{C2}+(\sigma_w/2M_{S2}t_2) = 2{,}550\ \text{Oe} \geqq |Hb| = 300\ \text{Oe}$$

In Formula 15, since $$H_{C1}-(\sigma_w/2M_{S1}t_1)=4{,}100\ \text{Oe}>0$$

$$H_{C2}+(\sigma_w/2M_{S2}t_2)=2{,}550\ \text{Oe}$$

if an initial field (Hini.) is 3,000 Oe, the medium No. 1 can satisfy Formula 15. Thus, the direction of magnetization of the second layer is reversed at the room temperature due to the initial field (Hini.) without reversing that of the first layer.

In addition, since the medium No. 1' satisfies: Formula 13:

$$H_{C1}=5{,}600\ \text{Oe}>(\sigma_w/2M_{S1}t_1=1{,}500\ \text{Oe}$$

and Formula 14-2:

$$|Hb|=300\ \text{Oe}>-H_{C2}+(\sigma_w/2M_{S2}t_2)=150\ \text{Oe}>0$$

if the influence of the initial field (Hini.) is removed, magnetization of the first and second layers can be maintained under protection the jointing field Hjoint.

Therefore, when the initial field (Hini.)=3,000 Oe is applied in the "A direction" (↑), the bias field Hb=300 Oe is applied in the "A direction" (↑) and the jointing field Hjoint is used for connecting them, an over-write operation is enabled.

EXAMPLE 2

One of Media No. 2'

A 500-Å thick first layer (recording layer) of $Tb_{27}Fe_{73}$ and a 303-Å thick second layer (reference layer) of $Dy_{27}Fe_{55}Co_{18}$ were sequentially formed on a substrate in the same manner as in Example 1. Then, a medium No. 2' belonging to Class 2 (i.e., P type, Quadrant I, and Type 2) was manufactured.

Table 3 below shows the manufacturing conditions and characteristics of the medium No. 2'.

TABLE 3

| | first layer | second layer |
|---|---|---|
| Evaporation source (2 Elements) | Tb Fe | Dy FeCo |
| Film Thickness: | 500 | 303 |
| Ms (emu/cc) | 120 | 150 |
| Hc (Oc) | 7000 | 1,500 |
| Tc (°C.) | 135 | 210 |
| Tcomp. (°C.) | None | 180 |
| $\sigma_w$ (Room Temperature) | 1.5 erg/cm$^2$ | |

If TL=150° C., TH=220° C., Hini=3,500 Oe and Hb=300 Oe, this medium satisfies:

Formula 16:

$$T_R<T_{C1}\approx T_L\approx Tcomp.2<T_{C2}\approx T_H$$

and Formula 17-2:

$$H_{C1}-(\sigma_w/2M_{S1}t_1) = 5{,}.750\ \text{Oe} > H_{C2}+(\sigma_w/2M_{S2}t_2) = 3{,}150\ \text{Oe} \geqq |Hb| = 300\ \text{Oe}$$

In Formula 20, since $$H_{C1}-(\sigma_w/2M_{S1}t_1)=5.750\ \text{Oe}$$

$$H_{C2}+(\sigma_w/2M_{S1}t_1)=3{,}150\ \text{Oe}$$

if an initial field (Hini.) is 3,500 Oe, the medium No. 2' can satisfy Formula 20. Thus, the direction of magnetization of the second layer is reversed at the room temperature due to the initial field (Hini.) without reversing that of the first layer.

In addition, since the medium No. 2' satisfies:

Formula 18:

$$H_{C1}=7{,}000\ \text{Oe}<(\sigma_w/2M_{S1}t_1)=1.250\ \text{Oe}$$

and Formula 19-2:

$$|Hb|=300\ \text{Oe}>-H_{C2}+(\sigma_w/2M_{S2}t_2)=150\ \text{Oe}>0$$

if the influence of the initial field (Hin.) is removed, magnetization of the first and second layers can be maintained under protection the jointing field Hjoint. Therefore, when the initial field (Hini.)=3,500 Oe is applied in the "A direction" (↑), the bias field Hb=300 Oe is applied in the "A direction" (↑) and the jointing field Hjoint is used for connecting them, an over-write operation is enabled.

EXAMPLE 3

One of Media No. 3'

A 2-element RF magnetron sputtering apparatus was used and included two targets DyFeCo alloy and GdDyFeCo alloy shown in Table 4. Targets DyFeCo alloy were first used, and GdDyFeCo alloy were then used. A 1.2-mm thick, 200-mm diameter glass substrate was placed inside a chamber of the apparatus.

The chamber of the apparatus was temporarily evacuated to a vacuum of $7\times10^{-7}$ Torr or less, and $5\times10^{-3}$ Torr. of At gas was introduced therein. Then, sputtering was performed at a deposition rate of about 2 Å/sec. Thereby, a 500-Å thick first layer (recording layer) of $Dy_{23}Fe_{69}Co_8$ was formed on the substrate. Subsequently, the targets were replaced while maintaining the vacuum state. Thereafter, sputtering was performed again to form a 435-Å thick second layer of $Gd_{22}Dy_5Fe_{69}Co_4$ on the first layer. Note that the first and second layers were perpendicular aniosotropy magnetic films.

In this way, a medium No. 3' belonging to Class 8 (i.e., A type, Quadrant IV, and Type 2) was manufactured.

Table 4 shows the manufacturing conditions and characteristics of the medium No. 3'.

TABLE 4

| | first layer | second layer |
|---|---|---|
| Target | DyFeCo alloy | GdDyFeCo alloy Fe |
| Film Thickness: (Å) | 500 | 435 |
| Ms (emu/cc) | 100 | 200 |
| Hc (Oe) | 6500 | 1,000 |
| Tc (°C.) | 140 | 220 |
| Tcomp. (°C.) | None | 190 |
| $\sigma_w$ (Room Temperature) | 2.0 erg/cm$^2$ | |

If $T_L$ 32 150° C., T=230° C., Hini=3,000 Oe and Hb=300 Oe, this medium satisfies:

Formula 21:

$$T_R<T_{C1}\approx T_L\approx Tcomp.2<T_{C2}\approx T_H$$

Formula 22-2:

$$H_{C1}+(\sigma_w/2M_{S1}t_1) = 8{,}500\ \text{Oe} > H_{C2}-(\sigma_w/2M_{S2}t_2) = 2{,}150\ \text{Oe} \geqq |Hb| = 300\ \text{Oe}$$

and Formula 22-3:

$$H_{C1}-H_{C2} = 5{,}500\ \text{Oe} > (\sigma_w/2M_{S1}t_1)-(\sigma_w/2M_{S2}t_2) = 850\ \text{Oe}$$

In Formula 25, since $H_{C1}+(\sigma_w/2M_{S1}t_1)=2{,}150$ Oe $$H_{C2}+(\sigma_w/2M_{S2}t_2)=8{,}500\ \text{Oe}$$

if an initial field (Hini.) is 2,500 Oe, the medium No. 3' can satisfy Formula 25. Thus, the direction of magnetization of the second layer is reversed at the room temperature due to the initial field (Hini.) without reversing that of the first layer.

In addition, since the medium No. 6 satisfies:

Formula 23:

$$H_{C1}=6{,}500\ \text{Oe}>(\sigma_w/2M_{hd\ S1}t_1)=2{,}000\ \text{Oe}$$

and Formula 24-2:

$$[Hb] = 300\ \text{Oe} > -H_{C2}+(\sigma_w/2M_{S2}t_2) = 150\ \text{Oe} > 0$$

If the influence of the initial field (Hini.) is removed, magnetization of the first and second layers can be maintained under protection the jointing field Hjoint.

Therefore, when the initial field (Hini.)=2,500 Oe is applied in the "A direction" (↑), the bias field Hb=300 Oe is applied in the "non-A direction" (1) and the jointing field Hjoint is used for connecting them, an over-write operation is enabled.

Figure 29:
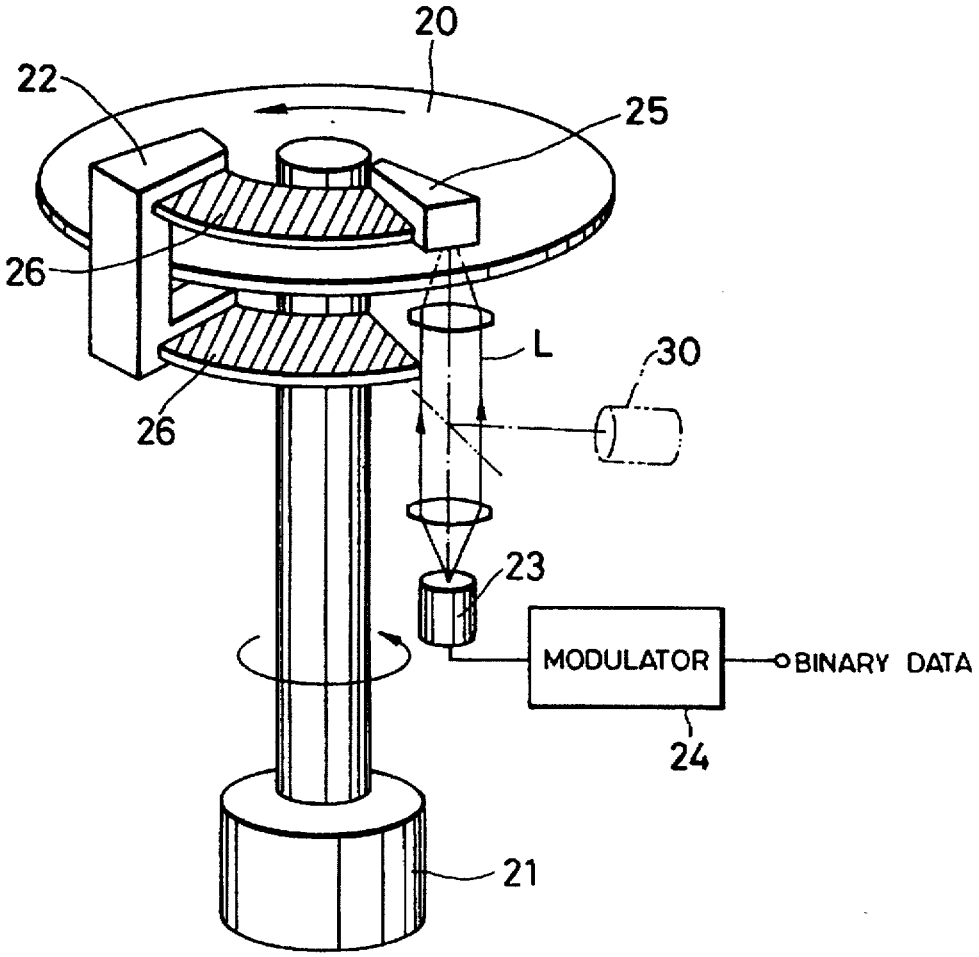
FIG. 29 is a perspective view of a magnetooptical recording apparatus according to an embodiment of the present invention.

An embodiment of an apparatus for magnetooptically recording and reproducing data using the recording medium described above will be described hereinafter. FIG. 29 shows the overall arrangement of the apparatus.

Figure 4:
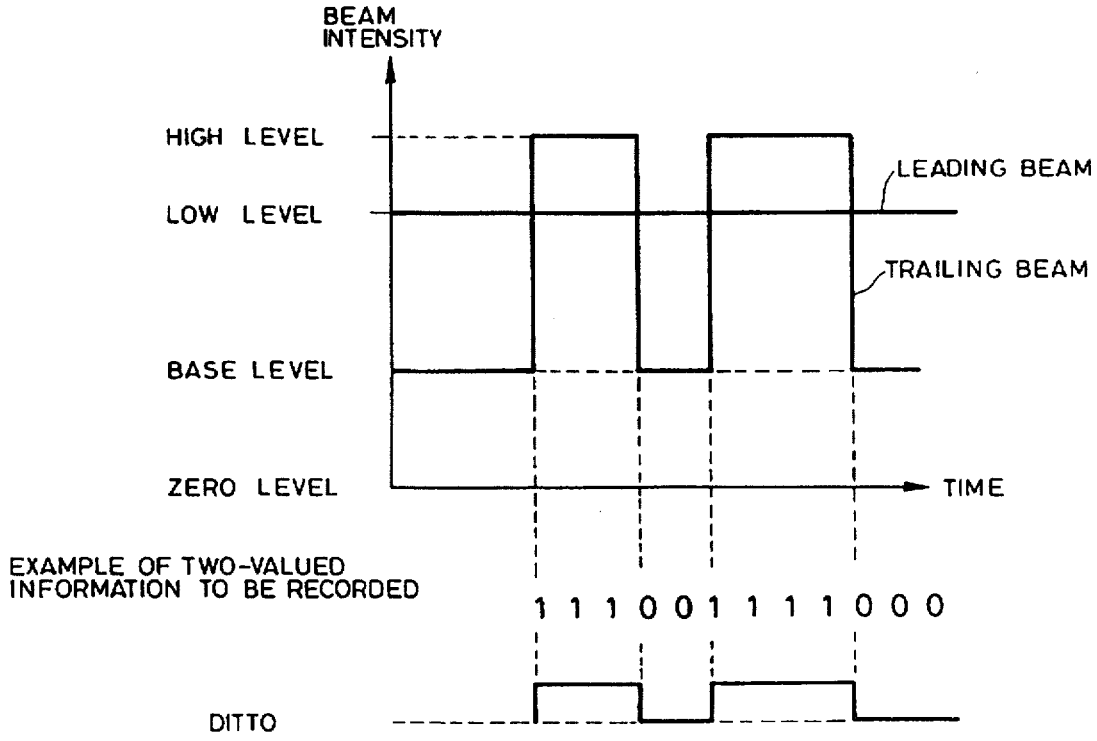
Figure 5A:
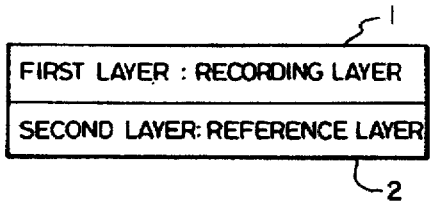
FIG. 5A is a diagram of a multilayered structure of a recording medium.
Figure 5B:
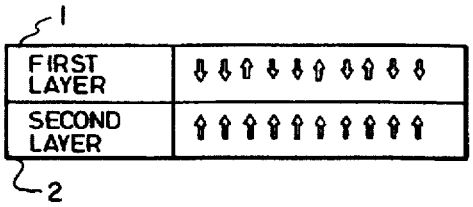
FIG. 5B is a diagram showing the direction of magnetization of first and second layers.
Figure 6:
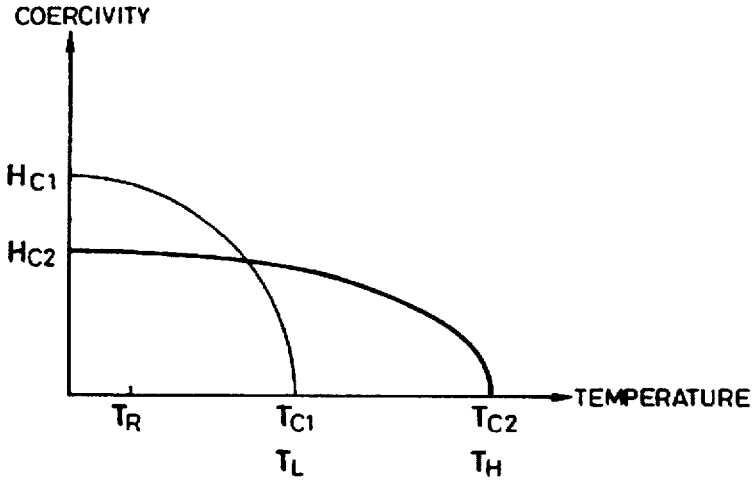
FIG. 6 is a graph showing the relationship between coercivity and temperature.
Figure 7:
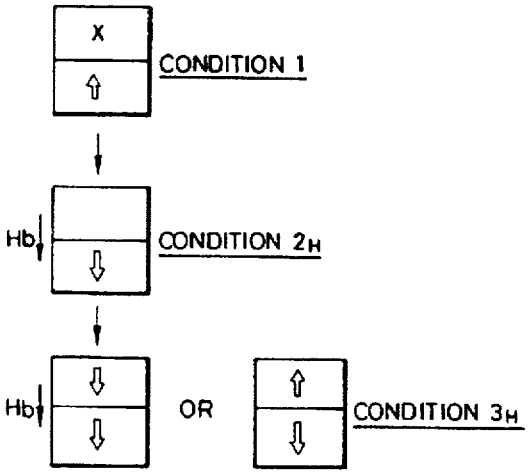
FIG. 7 illustrate changes in the direction of magnetization at high level.
Figure 8:
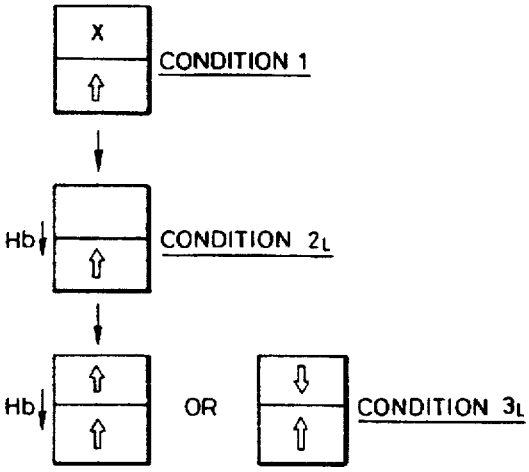
FIG. 8 illustrates changes in the direction of magnetization at low level.
Figure 9:
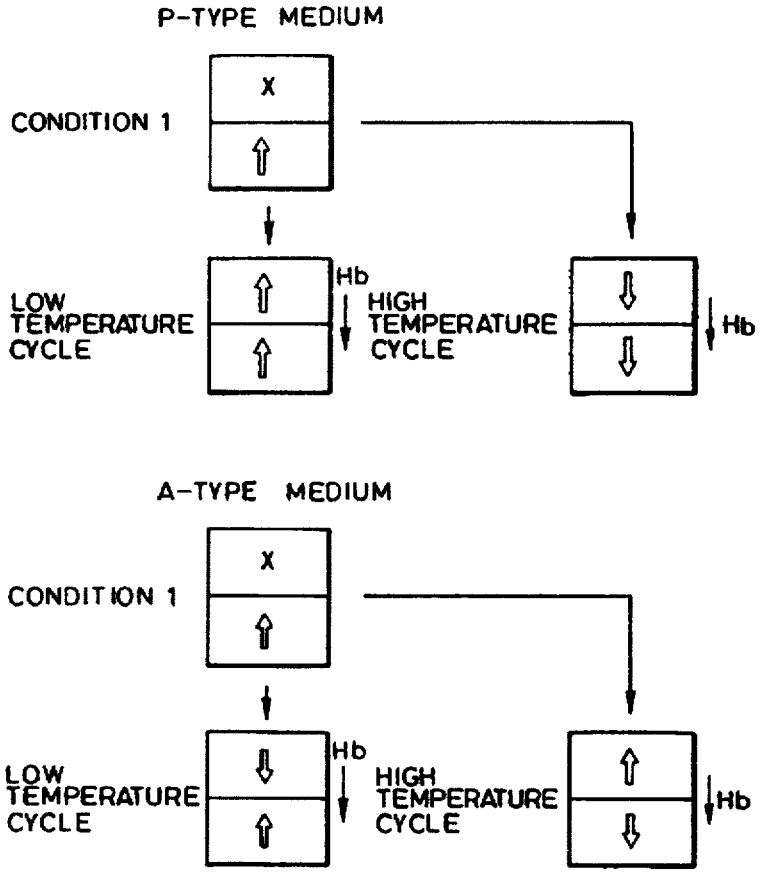
FIG. 9 illustrates flows of the changes in the direction of magnetization shown in FIGS. 7 and 8 for respective P- and A-type media.
Figure 10:
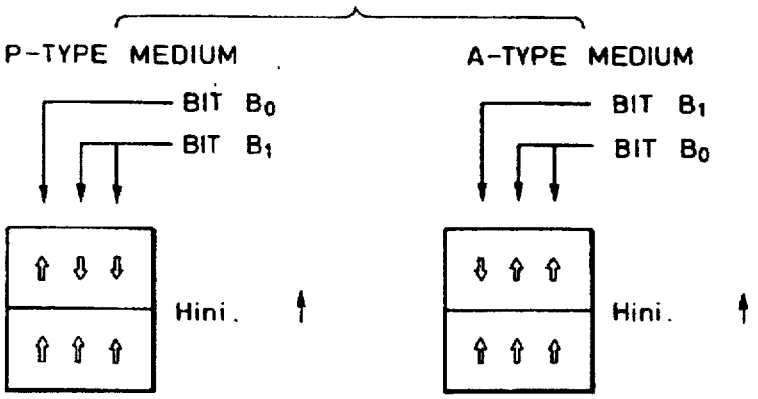
FIG. 10 illustrates diagrams showing the direction of magnetization of first and second layers for respective P- and A-type media.
Figure 11:
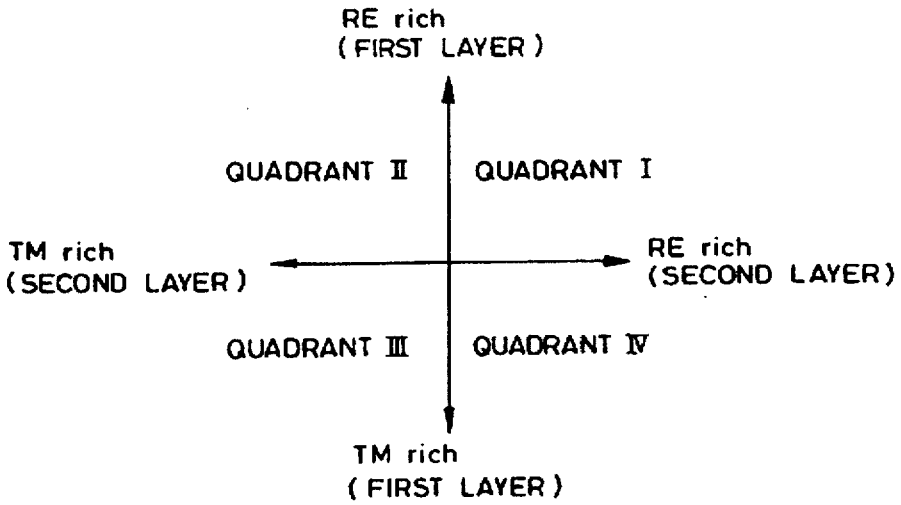
FIG. 11 is a map wherein the types of media of the present invention are classified into four quadrants.
Figure 13:
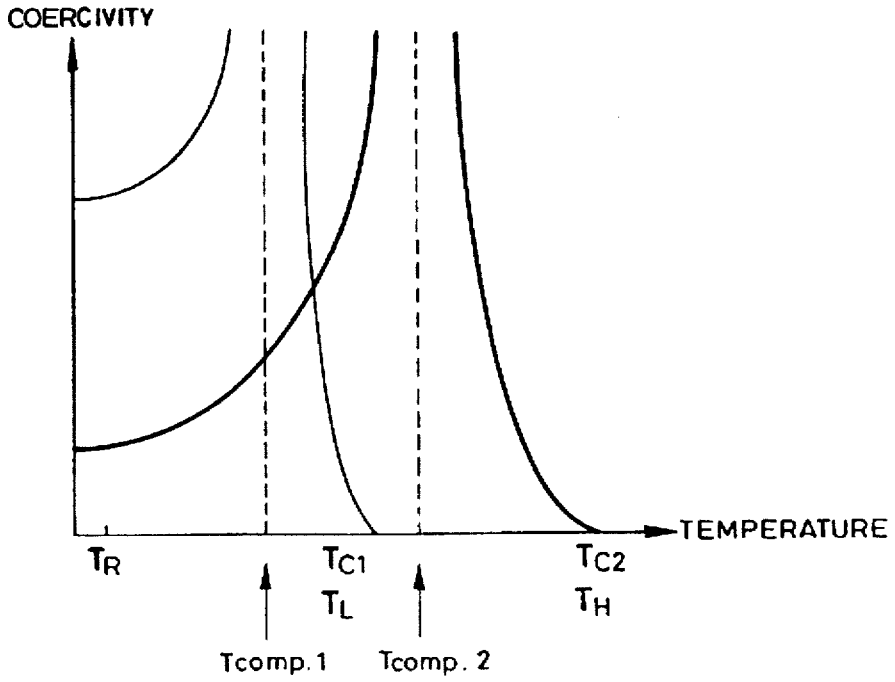
FIG. 13 is a graph showing the relationship between the coercivity and the temperature for a medium No. 1.
Figure 12A:
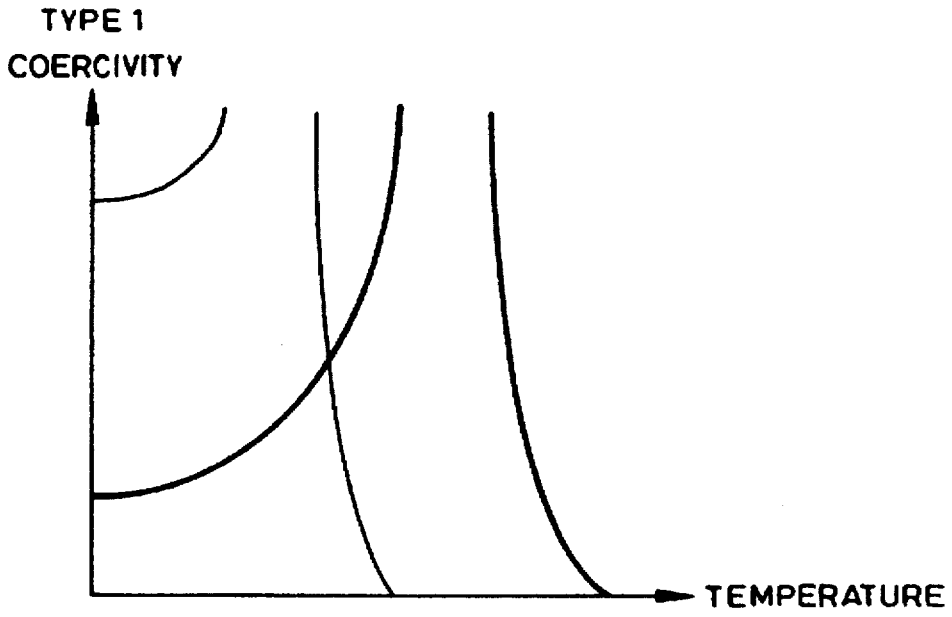
FIGS. 12A to 12D are graphs showing the relationship between the coercivity and the temperature respectively for media of Types I to IV.
Figure 12B:
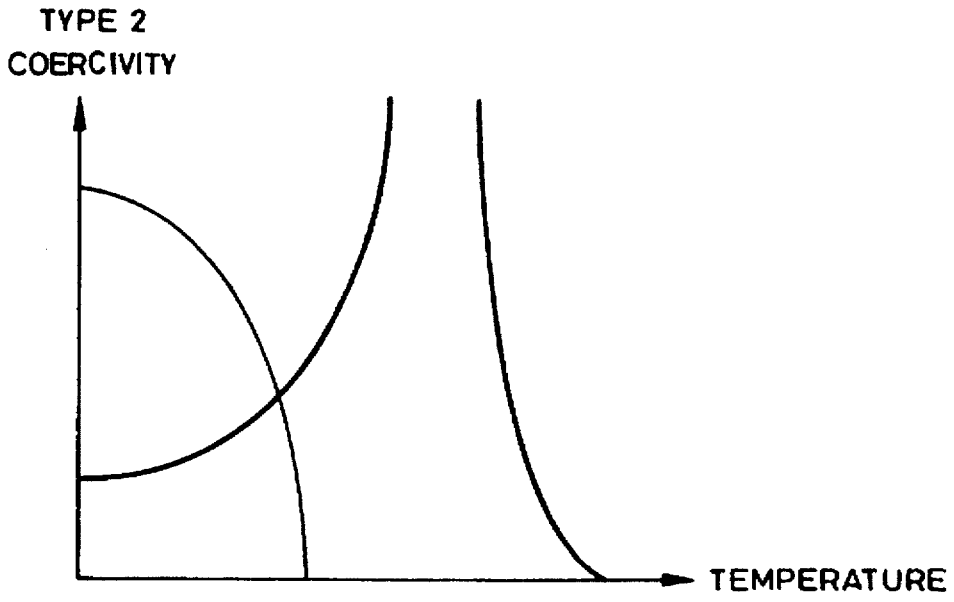
Figure 12C:
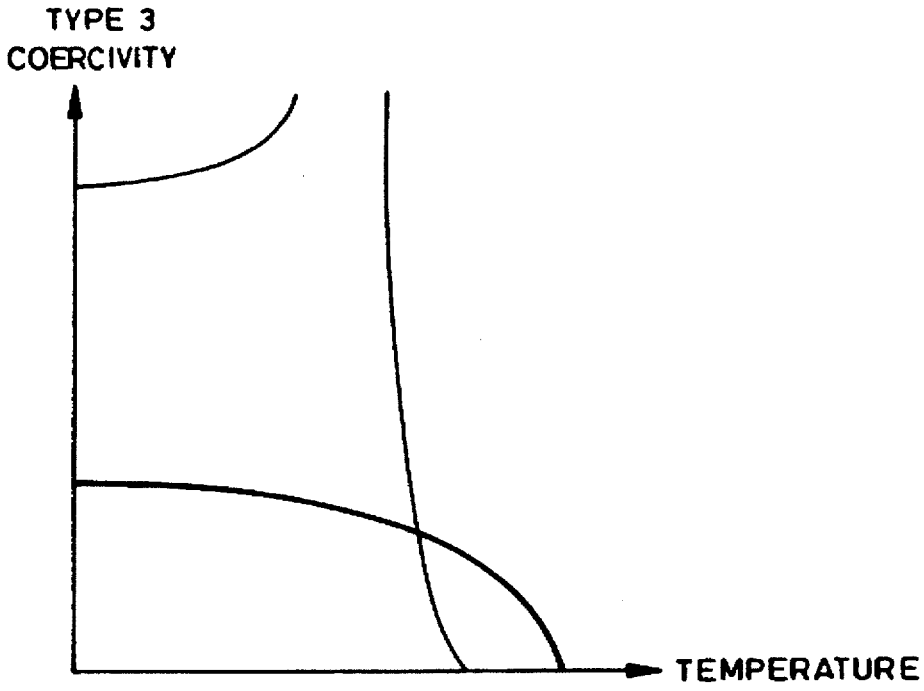
Figure 12D:
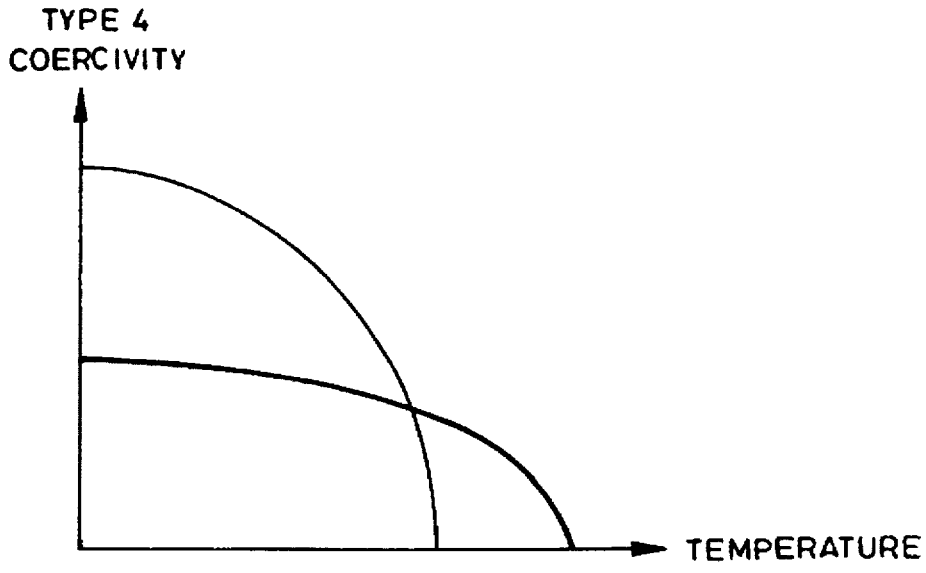
Figure 14:
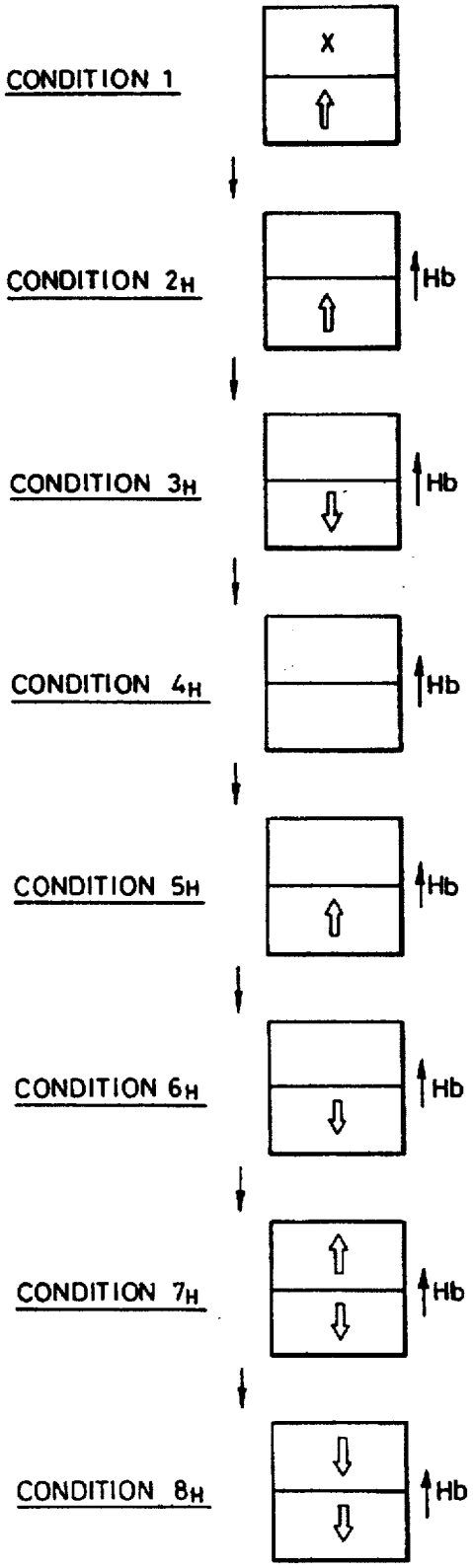
FIGS. 14 and 15 are diagrams showing changes in the direction of magnetization in high- and low-temperature cycles of a medium No. 1.
Figure 15:
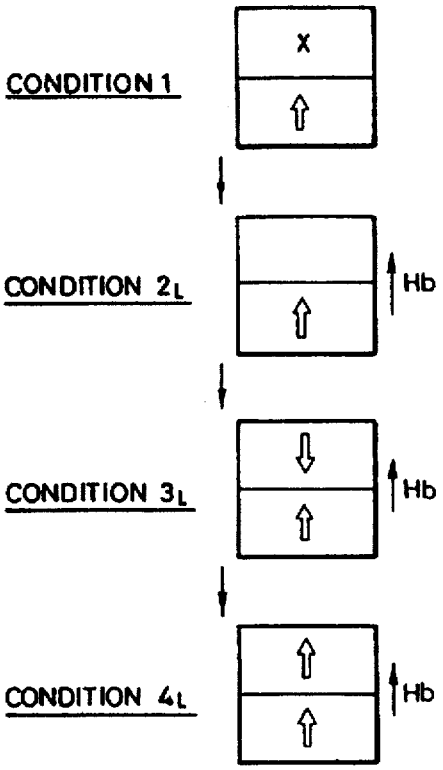
Figure 16:
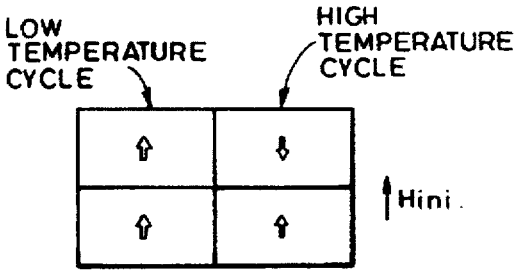
FIGS. 16, 19 and 20 illustrate diagrams showing the direction of magnetization of first and second layers.
Figure 18:
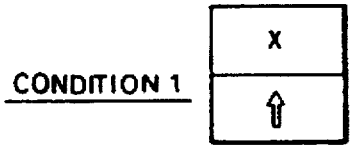
FIG. 18 is a diagram showing the direction of magnetization of first and second layers.
Figure 17:
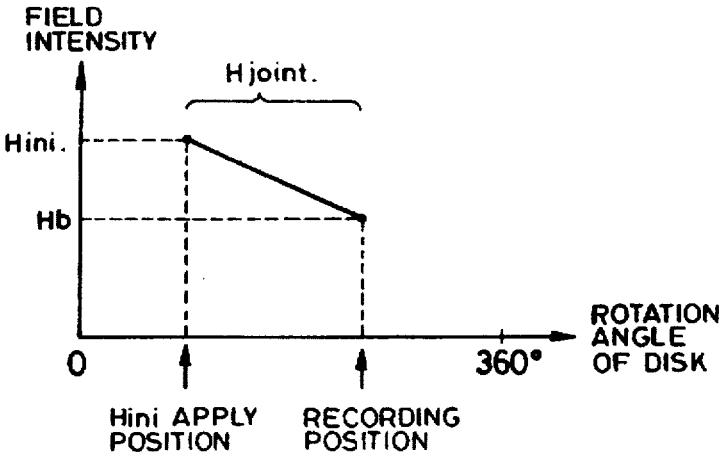
FIG. 17 is a graph showing the relationship between field intensity and rotation angle of a disk.
Figure 19:
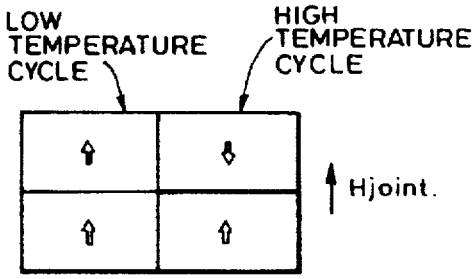
Figure 20:
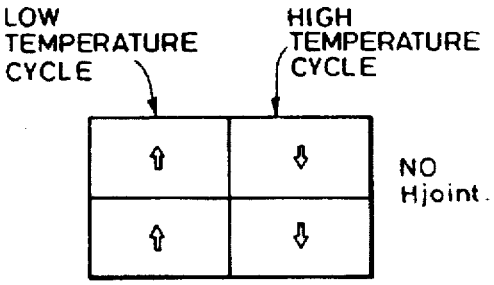
Figure 21:
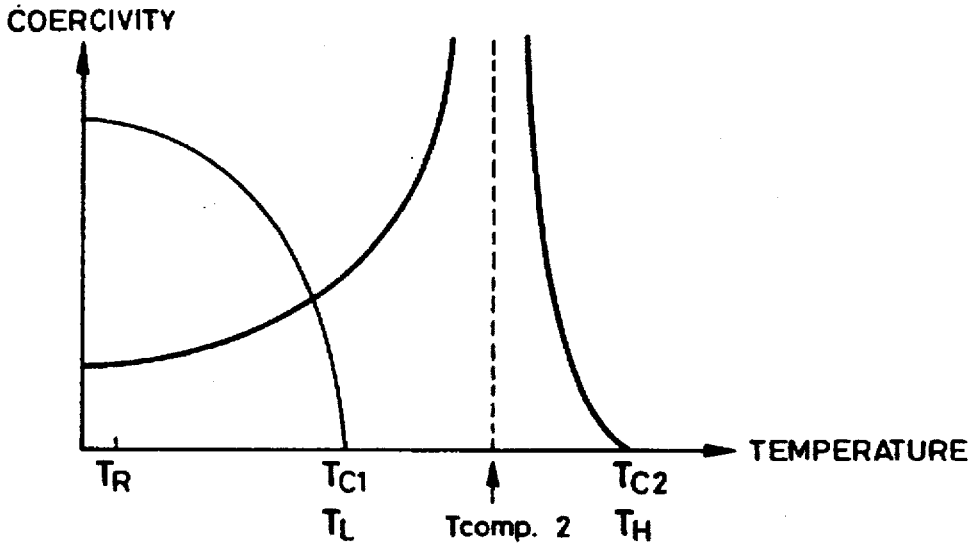
FIG. 21 is a graph showing the relationship between the coercivity and the temperature for the medium No. 2.
Figure 24:
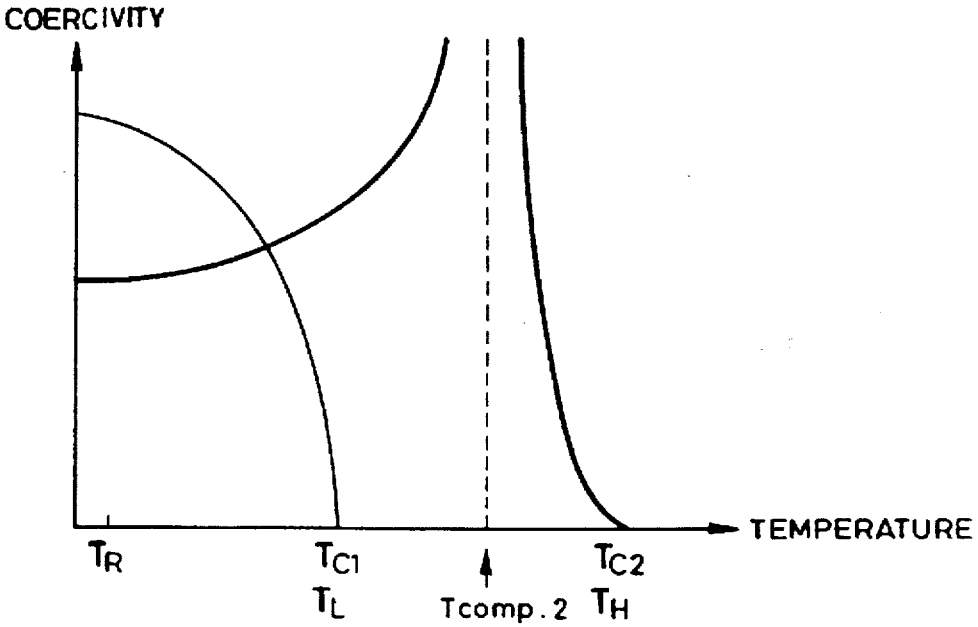
FIG. 24 is a graph showing the relationship between the coercivity and the temperature for a medium No. 8.
Figure 22:
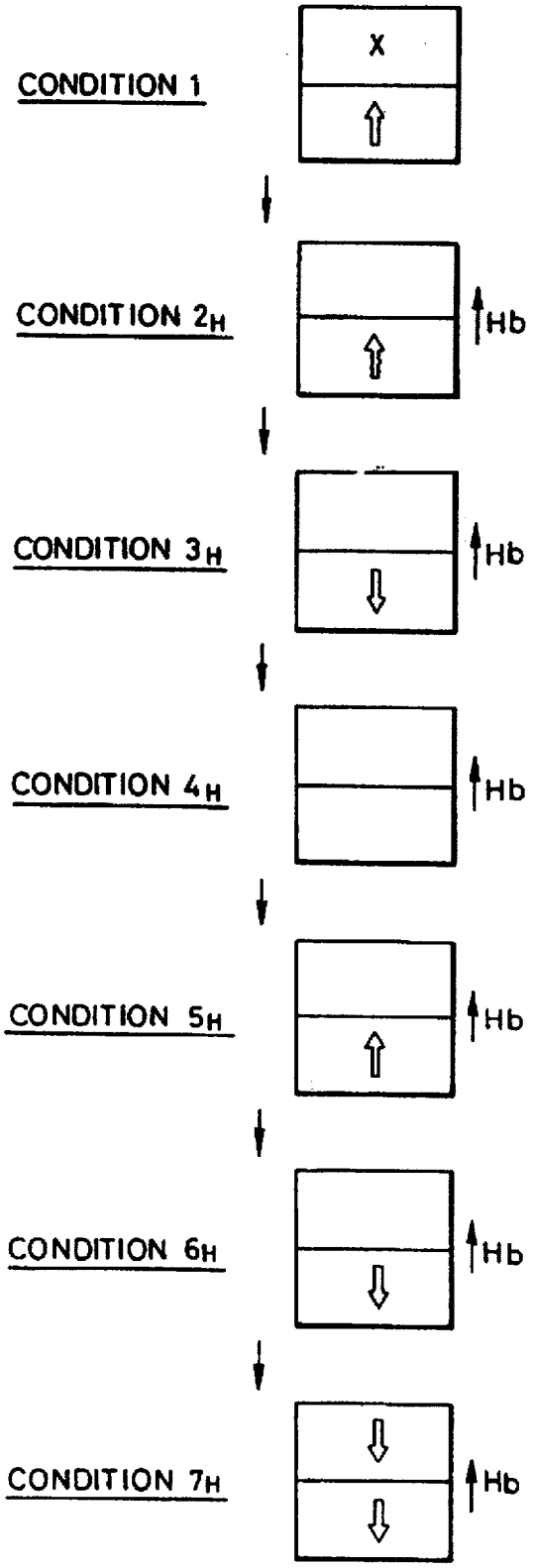
FIGS. 22 and 23 are diagrams showing the changes in the direction of magnetization in high- and low-temperature cycles of a medium No. 2.
Figure 23:
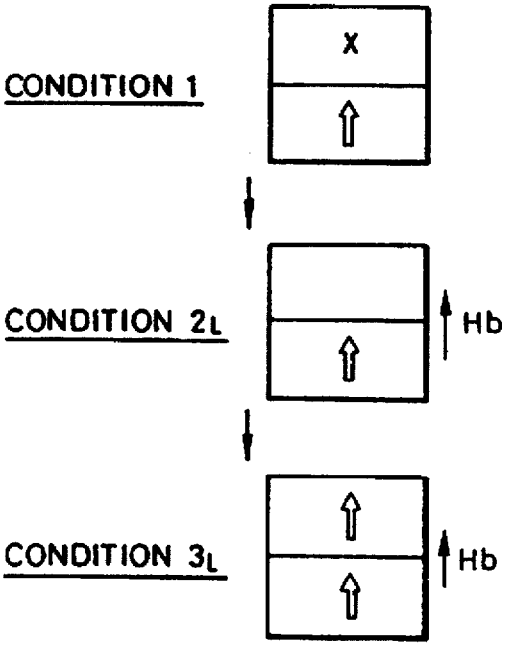
Figure 25:
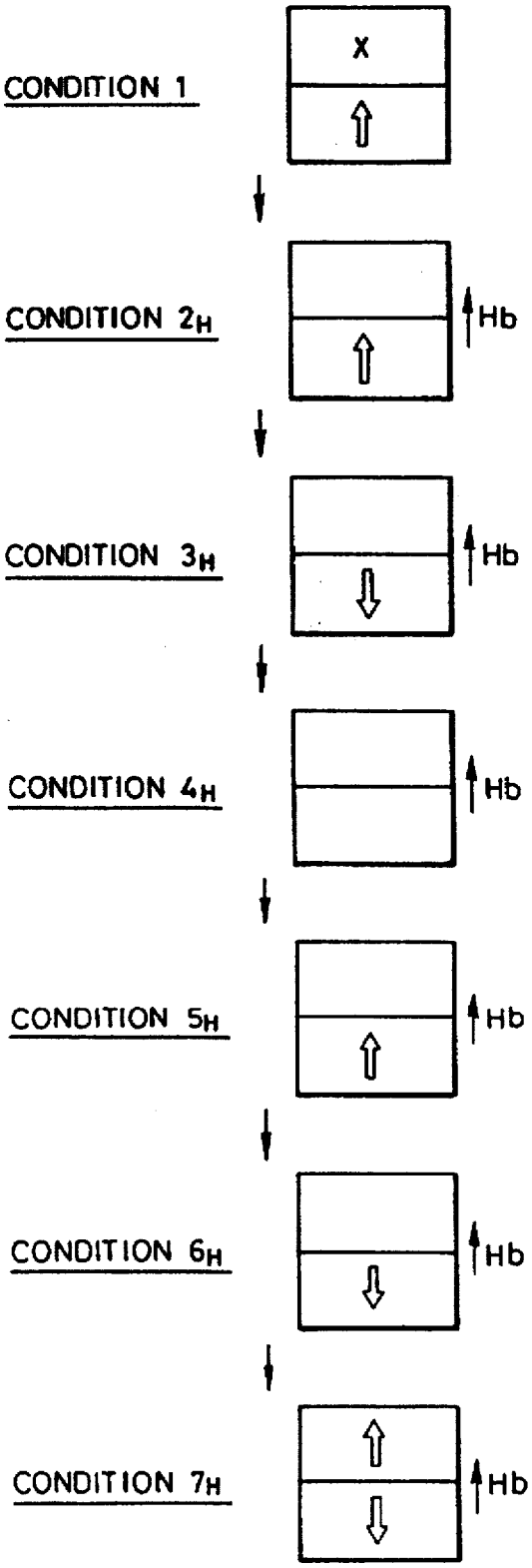
FIGS. 25 and 26 are diagrams showing the changes in the direction of magnetization in high- and low-temperature cycles of the medium No. 8.
Figure 26:
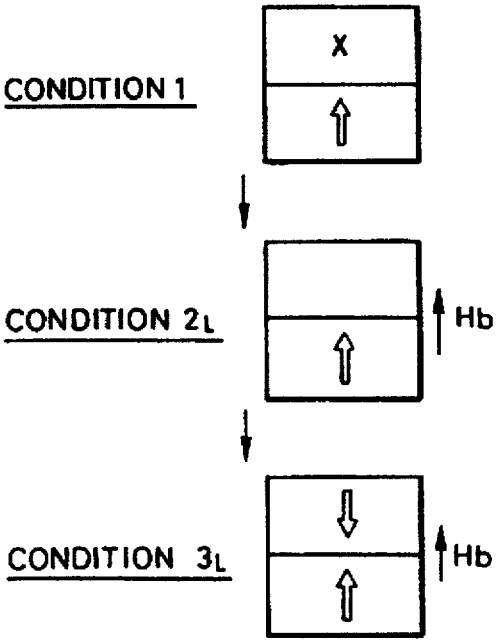
Figure 27:
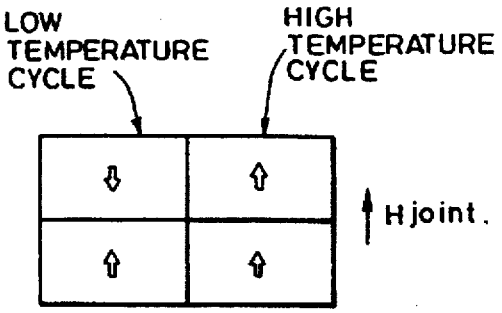
FIGS. 27 and 28 are diagrams showing the direction of magnetization of first and second layers.
Figure 28:
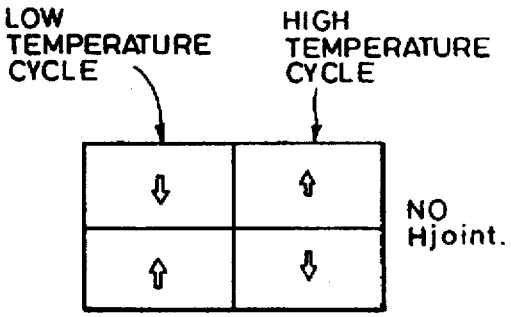

The apparatus basically comprises:

a rotating means 21 for rotating a recording medium 20;

a means for applying the jointing field Hjoint. which continuously changes from the initial field Hini. to the bias field Hb;

a laser beam light source 23; and a means 24 for pulse modulating the intensity of a laser beam in accordance with binary data to be recorded between (1) high level for providing a medium temperature $T_L$ suitable for forming one of a bit having upward-magnetization and a bit having downward-magnetization and (2) low level for providing the medium temperature $T_L$ suitable for forming the other bit. A light source 30 for supplying a leading beam described with reference to FIG. 4 may be provided as indicated by an imaginary line.

In this embodiment, the jointing field applying means comprises an initial field applying means 22, a bias field applying means 25, and an iron segment 26 for coupling these means 22 and 25. The iron segment 26 encloses 20 and adds the leakage fields from the means 22 and 25 so as to generate a magnetic field which continuously changes from one to another.

As the initial field applying means 22, a permanent magnet having Hini.=3,000 Oe (or 3,500 Oe) and "A-directed" ↑ magnetization is used. In place of the permanent magnet, an electromagnet may be used. As the bias field applying means 25, a permanent magnet having Hb=300 Oe and "A-directed" ↑ magnetization is used. An electromagnet may be used in place of the permanent magnet. When a reproduction field $H_R$ is to be applied, an electromagnet having a variable field intensity is preferably used.

Note that the joint field applying means is stationarily arranged in the recording apparatus, and is not moved together with a recording head (pickup) including the light source 23. With this arrangement, the pickup can be made lightweight, and high-speed access can be achieved.

Figure 30:
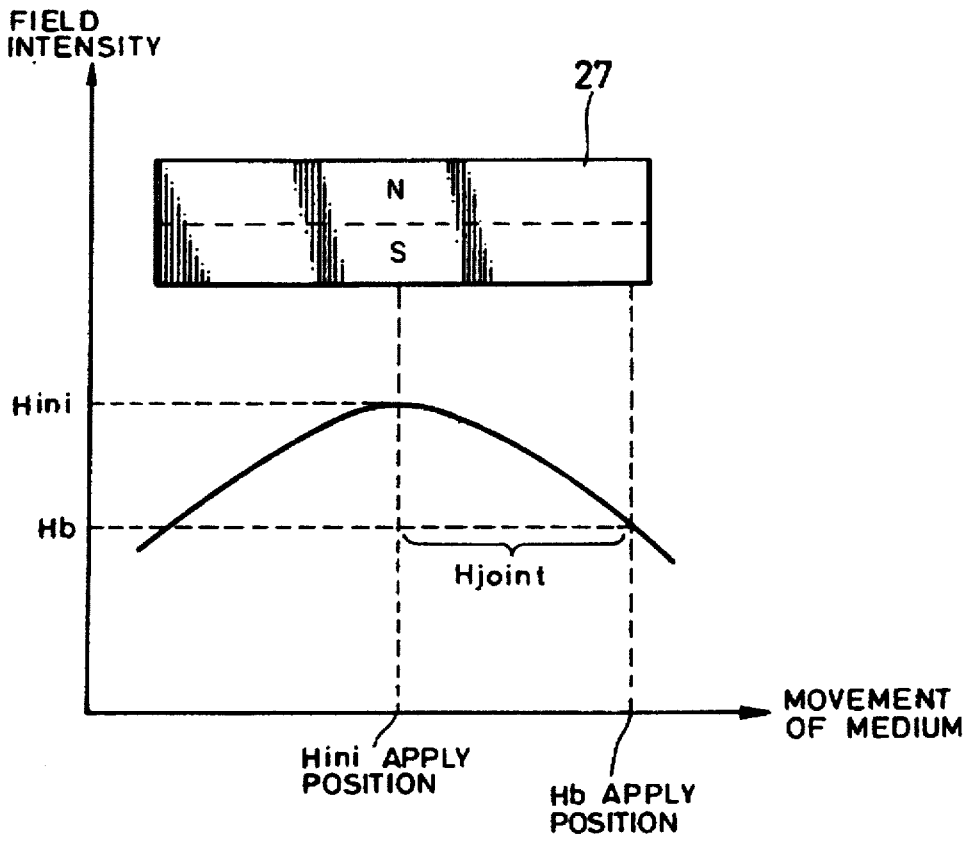
FIG. 30 is a graph showing field intensity relative to position on a permanent magnet.

The joint field applying means need not always comprise two magnets 22 and 25 for applying the fields Hini. and Hb, respectively. For example, a single permanent magnet 27 may have a field intensity distribution with a maximum value somewhere (at substantially the central portion), and with the field intensity gradually decreasing toward the ends of the magnet, as shown in FIG. 30. Therefore, if a magnetic field at a high-intensity portion of a single magnet is used as the HinL, and that at a low-intensity portion is used as the Hb, the jointing field may thus be provided.

Figure 31:
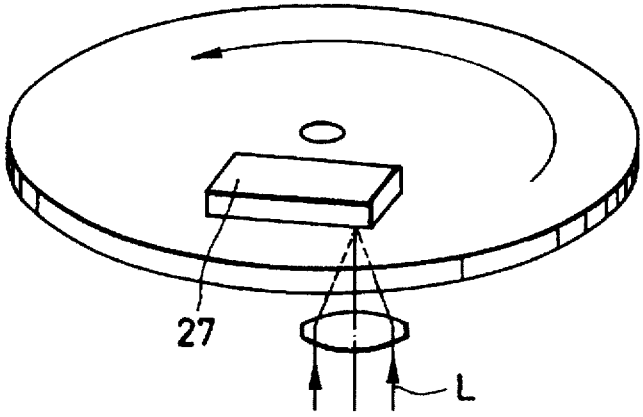
FIG. 31 is a perspective view of a magnetooptical recording apparatus according to an embodiment of the present invention.

In this case, the magnet is arranged, as shown in FIG. 31 to apply the "A-directed" ↑ Hini.=2,500 Oe and Hb=300 Oe to predetermined positions of the medium. Thus, the magnet can be used as a recording apparatus.

A magnetooptical recording operation using the recording apparatus shown in FIG. 29 will be described below. The recording medium (No. 1') of the embodiment 1 is moved at a constant linear speed of 8.5 m/sec by the rotating means 21. A laser beam is radiated on the rotating medium. The beam is adjusted by a modulator 24 to obtain outputs of 8.9 mW (on disk) at high level and 6.1 mW (on disk) at low level, and is pulse modulated in accordance with binary data. If data to be recorded is a signal at a frequency of 1 MHz, the beam is radiated on the medium while being modulated at a frequency of 1 MHz. In this case, Hini.=3,000 Oe. Thus, a 1-MHz signal is recorded.

In order to check a recorded state, when data recorded in the second layer is reproduced with a beam power of 1.5 mW (on disk) using a normal magnetooptical reproduction apparatus, a reproduction signal having a C/N ratio of 53 dB can be obtained. Thus, it can be confirmed that data was recorded.

A signal having a frequency of 2 MHz is recorded as new data in a region of the medium in which data has already been recorded. When this data is reproduced similarly, new data is reproduced at a C/N ratio of 52 dB. In this case, no 1-MHz signal (previous data) appears at all.

As a result, it is found that the over-write operation can be performed.

Under this condition, the temperature of the medium reaches $T_H$=220° C. at high level, and $T_L$=160° C. at low level.

Another magnetooptical recording operation using the recording apparatus shown in FIG. 29 will be described below. A laser beam (8.9 mW (on disk) at high level; 5.7 mW (on disk) at low level) is radiated on a recording medium (No. 2') of embodiment 2 which is moved at a speed of 8.5 m/sec while being modulated at a frequency of 1 MHz. In this case, Hini.=3,500 Oe. Thus, a 1-MHz signal is recorded.

The data is reproduced with a beam power of 1.5 mW (on disk). Thus, a reproduction signal having a C/N ratio of 52 dB can be obtained.

A signal at a frequency of 4 MHz is recorded as new data in a region of the medium in which data has already been recorded. When the data is reproduced similarly, new data is reproduced at a C/N ratio of 49 dB. In this case, no 1-MHz signal (previous data) appears at all.

As a result, it is found that the over-write operation can be performed.

Under this condition, the temperature of the medium reaches $T_H$=220° C. at high level, and $T_L$150° C. at low level.

A magnetooptical recording operation using the recording apparatus shown in FIG. 31 will be described below. A laser beam (9.3 mW (on disk) at high level; 5.7 mW (on disk) at low level) is radiated on a recording medium (No. 2') of embodiment 2 which is moved at a speed of 8.5 m/sec while being modulated at a frequency of 2 MHz. Thus, a 2-MHz signal is recorded.

The data is reproduced with a beam power of 1.5 mW (on disk). Thus, a reproduction signal having a C/N ratio of 51 dB can be obtained.

A signal having a frequency of 3 MHz is recorded as new data in a region of the medium in which data has already been recorded. When the data is reproduced similarly, new data is reproduced at a C/N ratio of 50 dB. In this case, no 2-MHz signal (previous data) appears at all.

As a result, it is found that the over-write operation can be performed.

Under this condition, the temperature of the medium reaches $T_H$=230° C. at high level, and $T_L$150° C. low level.

What is claimed is:

1. A magnetooptical recording method comprising the steps of:

(a) providing a disk-shaped magnetooptical recording medium having a perpendicular magnetic anisotropy film of a multilayered structure including a fist layer as a recording layer and a second layer as a reference layer;

(b) rotating said medium;

(c) applying an initial field to said medium at a first position so that a direction of magnetization of said second layer is aligned in advance along a first direction perpendicular to said film;

(d) applying to said medium at a second position a bias field of lower intensity than said initial field;

(e) applying to said medium a jointing field which continuously varies in intensity along a rotating direction of said medium from he initial field at said first position to the bias field at said second position; and (f) radiating an energy beam which is modulated in accordance with binary data to be recorded onto said medium at said second position;

whereby when an intensity of the modulated energy beam is at high level, one of a bit having magnetization in the first direction and a bit having magnetization in a second direction opposite to the first direction is formed in said first layer, and when the intensity of the modulated energy beam is al low level, the other bit is formed in said first layer.

2. A method according to claim 1, wherein when the intensity of the energy beam is at high level, the first direction of magnetization of said second layer is reversed to the second direction by the bias field, and said one bit is formed in said first layer by the reversed magnetization, and when the intensity of the energy beam is at low level, said other bit is formed in said first layer by magnetization in the first direction of said second layer.

3. A method according to claim 1, wherein the energy beam consists of adjacent leading and trailing beams, the leading beam has a substantially constant intensity, and the trailing beam is modulated in accordance with the binary data between said high level and base level lower than said low level.

4. A method according to claim 1, wherein the recording medium provided is formed so as to include a substrate with said perpendicular magnetic anisotropy film thereon;

said first layer comprising a transition metal-heavy rare earth alloy which is heavy rare earth rich and has a compensation temperature between a room temperature and a Curie temperature, said second layer comprising a transition metal-heavy rare earth alloy which is heavy rare earth rich and has a compensation temperature between a room temperature and a Curie temperature, and said medium satisfying following Formula (1):

$$T_R<T_{comp.1}<T_{C1}=T_L=T_{comp.2}<T_{C2}=T_H \quad (1)$$

and satisfying at the room temperature following Formulas:

$$H_{C1}-\frac{\sigma w}{2M_{S1}t_1}>H_{C2}+\frac{\sigma w}{2M_{S2}t_2}\geqq |Hb| \quad (2)$$

$$H_{C1}>\frac{\sigma w}{2M_{S1}t_1} \quad (3)$$

-continued $$|Hb| > -H_{C2} + \frac{\sigma w}{2M_{S2}t_2} > 0 \quad (4)$$

$$H_{C2} + \frac{\sigma w}{2M_{S2}t_2} < |Hini.| < H_{C1} - \frac{\sigma w}{2M_{S1}t_1} \quad (5)$$

where $T_R$: room temperature $T_{comp.1}$: compensation temperature of first layer $T_{comp.2}$: compensation temperature of second layer $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $M_{S1}$: saturation magnetization of first layer $M_{S2}$: saturation magnetization of second layer $t_1$: thickness of first layer $t_2$: thickness of second layer $\sigma_w$: interface wall energy Hini.: initial field Hb: bias field.

5. A method according to claim 1, wherein the recording medium provided is formed so as to include a substrate with said perpendicular magnetic anisotropy film thereon;

said first layer comprising a transition metal-heavy rare earth alloy which is heavy rare earth rich and does not have a compensation temperature between a room temperature and a Curie temperature, said second layer comprising a transition metal-heavy rare earth alloy which is heavy rare earth rich and has a compensation temperature between the room temperature and the Curie temperature, and said medium satisfying following Formula (1):

$$T_R < T_{C1} \approx T_L \approx T_{comp.2} < T_{C2} \approx T_H \quad (2)$$

and satisfying at the room temperature following Formulas:

$$H_{C1} - \frac{\sigma w}{2M_{S1}t_1} > H_{C2} + \frac{\sigma w}{2M_{S2}t_2} \geqq |Hb| \quad (2)$$

$$H_{C1} > \frac{\sigma w}{2M_{S1}t_1} \quad (3)$$

$$|Hb| > -H_{C2} + \frac{\sigma w}{2M_{S2}t_2} > 0 \quad (4)$$

$$H_{C2} + \frac{\sigma w}{2M_{S2}t_2} < |Hini.| < H_{C1} - \frac{\sigma w}{2M_{S1}t_1} \quad (5)$$

where $T_R$: room temperature $T_{comp.2}$: compensation temperature of second layer $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $M_{S1}$: saturation magnetization of first layer $M_{S2}$: saturation magnetization of second layer $t_1$: thickness of first layer $t_2$: thickness of second layer $\sigma_w$: interface wall energy Hini.: initial field Hb: bias field.

6. A method according to claim 1, wherein the recording medium provided is formed so as to include a substrate with said perpendicular magnetic anisotropy film thereon:

said first layer comprising a transition metal-heavy rare earth alloy which is heavy rare earth rich and does not have a compensation temperature between a room temperature and a Curie temperature, said second layer comprising a transition metal-heavy rare earth alloy which is heavy rare earth rich and has a compensation temperature between the room temperature and the Curie temperature, and said medium satisfying following Formula (1):

$$T_R < T_{C1} \approx T_L \approx T_{comp.2} < T_{C2} \approx T_H \quad (1)$$

and satisfying at the room temperature following Formulas:

$$H_{C1} - \frac{\sigma w}{2M_{S1}t_1} > H_{C2} + \frac{\sigma w}{2M_{S2}t_2} \geqq |Hb| \quad (2)$$

$$H_{C1} - H_{C2} > \frac{\sigma w}{2M_{S1}t_1} - \frac{\sigma w}{2M_{S2}t_2} \quad (2\text{-}2)$$

$$H_{C1} > \frac{\sigma w}{2M_{S1}t_1} \quad (3)$$

$$|Hb| > -H_{C2} + \frac{\sigma w}{2M_{S2}t_2} > 0 \quad (4)$$

$$H_{C2} + \frac{\sigma w}{2M_{S2}t_2} < |Hini.| < H_{C1} - \frac{\sigma w}{2M_{S1}t_1} \quad (5)$$

where $T_R$: room temperature $T_{comp.2}$: compensation temperature of second layer $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of firm layer $H_{C2}$: coercivity of second layer $M_{S1}$: saturation magnetization of first layer $M_{S2}$: saturation magnetization of second layer $t_1$: thickness of first layer $t_2$: thickness of second layer $\sigma_w$: interface wall energy Hini.: initial field Hb: bias field.

7. A magnetooptical recording apparatus comprising:

means for rotating a disk-shaped magnetooptical recording medium including a perpendicular magnetic anisotropy film;

means for applying an initial field tb said medium at a first position;

means for applying to said medium at a second position a bias field of lower intensity than said initial field;

means for applying to said medium a jointing field which continuously varies in intensity from the initial field at sam first position to the bias field at said second position in a rotating direction of said medium;

means for supplying, onto said medium at said second position, an energy beam for locally heating said medium; and means for modulating an intensity of the energy beam in accordance with binary data to be recorded between high level for providing a temperature suitable for forming in said perpendicular magnetic anisotropy film a bit having magnetization in a first direction perpendicular to the surface of said medium and low level for providing a temperature suitable for forming in said perpendicular magnetic anisotropy film a bit having magnetization in a second direction opposite to the first direction.

8. An apparatus according to claim 7, wherein said energy beam supplying means supplies adjacent leading and trailing beams, the leading beam has a substantially constant intensity, and the trailing beam is modulated in accordance with the binary data between said high level and base level lower than said low level.

9. An apparatus according to claim 7, wherein said recording medium comprises a substrate having said perpendicular magnetic anisotropy film thereon, said film having a multilayered structure including first and second layers;

said first layer comprising a transition metal-heavy rare earth alloy which is heavy rare earth rich and has a compensation temperature between a room temperature and a Curie temperature, said second layer comprising a transition metal-heavy rare earth alloy which is heavy rare earth rich and has a compensation temperature between a room temperature and a Curie temperature, and said medium satisfying following Formula (1):

$$T_R<T_{comp.1}<T_{C1}\approx T_L\approx T_{comp.2}<T_{C2}\approx T_H \quad (1)$$

and satisfying at the room temperature following Formulas:

$$H_{C1}-\frac{\sigma w}{2M_{S1}t_1}>H_{C2}+\frac{\sigma w}{2M_{S2}t_2}\geqq |Hb| \quad (2)$$

$$H_{C1}>\frac{\sigma w}{2M_{S1}t_1} \quad (3)$$

$$|Hb|>-H_{C2}+\frac{\sigma w}{2M_{S1}t_1}>0 \quad (4)$$

$$H_{C2}+\frac{\sigma w}{2M_{S2}t_2}<|Hini.|<H_{C1}-\frac{\sigma w}{2M_{S1}t_1} \quad (5)$$

where $T_R$: room temperature $T_{comp.1}$: compensation temperature of first layer $T_{comp.1}$: compensation temperature Of second layer $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $M_{S1}$: saturation magnetization of first layer $M_{S2}$: saturation magnetization of second layer $t_3$: thickness of first layer $t_2$: thickness of second layer $\sigma_w$: interface wall energy Hini.: initial field Hb: bias field.

10. An apparatus according to claim 7, wherein said recording medium comprises a substrate having said perpendicular magnetic anisotropy film thereon, said film having a multilayered structure including first and second layers;

said first layer comprising a transition metal-heavy rare earth alloy which is heavy rare earth rich and does not have a compensation temperature between a room temperature and a Curie temperature, said second layer comprising a transition metal-heavy rare earth alloy which is heavy rare earth rich and has a compensation temperature between the room temperature and the Curie temperature, and said medium satisfying following Formula (1):

$$T_R<T_{C1=TL}\approx T_{comp.2}<T_{C2}\approx T_H \quad (1)$$

and satisfying at the room temperature following Formulas:

$$H_{C1}-\frac{\sigma w}{2M_{S1}t_1}>H_{C2}+\frac{\sigma w}{2M_{S2}t_2}\geqq |Hb| \quad (2)$$

$$H_{C1}>\frac{\sigma w}{2M_{S1}t_1} \quad (3)$$

$$|Hb|>-H_{C2}+\frac{\sigma w}{2M_{S1}t_1}>0 \quad (4)$$

$$H_{C2}+\frac{\sigma w}{2M_{S2}t_2}<|Hini.|<H_{C1}-\frac{\sigma w}{2M_{S1}t_1} \quad (5)$$

where $T_R$: room temperature $T_{comp.2}$: compensation temperature of second layer $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $M_{S1}$: saturation magnetization of first layer $M_{S2}$: saturation magnetization of second layer $t_1$: thickness of first layer $t_2$: thickness of second layer $\sigma_w$: interface wall energy Hini.: initial field Hb: bias field.

11. An apparatus according to claim 7, wherein said recording medium comprises a substrate having said perpendicular magnetic anisotropy film thereon, said film having a multilayered structure including first and second layers;

said first layer comprising a transition metal-heavy rare earth alloy which is heavy rare earth rich and does not have a compensation temperature between a room temperature and a Curie temperature, said second layer comprising a transition metal-heavy rare earth alloy which is heavy rare earth rich and has a compensation temperature between the room temperature and the Curie temperature, and said medium satisfying following Formula (1):

$$T_R<T_{C1}\approx T_L\approx T_{comp.2}<T_{C2}\approx T_H \quad (1)$$

and satisfying at the room temperature following Formulas:

$$H_{C1}+\frac{\sigma w}{2M_{S1}t_1} > H_{C2}+\frac{\sigma w}{2M_{S2}t_2} \geqq |Hb| \quad (2)$$

$$H_{C1}-H_{C2} > \frac{\sigma w}{2M_{S1}t_1} - \frac{\sigma w}{2M_{S2}t_2} \quad (2\text{-}2)$$

$$H_{C1} > \frac{\sigma w}{2M_{S1}t_1} \quad (3)$$

$$|Hb| > -H_{C2}+\frac{\sigma w}{2M_{S1}t_1} > 0 \quad (4)$$

$$H_{C2}+\frac{\sigma w}{2M_{S2}t_2} < |Hini.| < H_{C1}-\frac{\sigma w}{2M_{S1}t_1} \quad (5)$$

where $T_R$: room temperature $T_{comp.2}$: compensation temperature of second layer $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $M_{S1}$: saturation magnetization of first layer $M_{S2}$: saturation magnetization of second layer $t_1$: thickness of first layer $t_2$: thickness of second layer $\sigma_w$: interface wall energy Hini.: initial field Hb: bias field.

*12. A magnetooptical recording apparatus comprising:*

*means for rotating a disk-shaped magnetooptical recording medium including a perpendicular magnetic anisotropy film;*

*means for applying an initial field to said medium at a first position;*

*means for applying to said medium at a second position a bias field of lower intensity than said initial field;*

*said initial field applying means and said bias field applying means cooperatively applying to said medium a jointing field which continuously varies in intensity from the initial field at said first position to the bias field at said second position in a rotating direction of said medium;*

*means for supplying, onto said medium at said second position, an energy beam for locally heating said medium; and*

*means for modulating an intensity of the energy beam in accordance with binary data to be recorded between high level for providing a temperature suitable for forming in said perpendicular magnetic anisotropy film a bit having magnetization in a first direction perpendicular to the surface of said medium and low level for providing a temperature suitable for forming in said perpendicular magnetic anisotropy film a bit having magnetization in a second direction opposite to the first direction.*

*13. A magnetooptical recording apparatus comprising:*

*means for rotating a disk-shaped magnetooptical recording medium including a perpendicular magnetic anisotropy film;*

*means for applying to said medium a continuous field continuously varying in intensity from an initial field at a first position to a bias field of lower intensity than the initial field at a second position in a rotating direction of said medium;*

*means for supplying, onto said medium at said second position, an energy beam for locally heating said medium; and*

*means for modulating an intensity of the energy beam in accordance with binary data to be recorded between high level for providing a temperature suitable for forming in said perpendicular magnetic anisotropy film a bit having a magnetization in a first direction perpendicular to the surface of said medium and low level for providing a temperature suitable for forming in said perpendicular magnetic anisotropy film a bit having magnetization in a second direction opposite to the first direction.*

*14. A magnetooptical recording apparatus comprising:*

*means for rotating a disk-shaped magnetooptical recording medium including a perpendicular magnetic anisotropy film;*

*means for applying to said medium a continuous field continuously decreasing in intensity from a first position to a second position in a rotating direction of said medium;*

*means for supplying, onto said medium at said second position, an energy beam for locally heating said medium; and*

*means for modulating an intensity of the energy beam in accordance with binary data to be recorded between high level for providing a temperature suitable for forming in said perpendicular magnetic anisotropy film a bit having magnetization in a first direction perpendicular to the surface of said medium and low level for providing a temperature suitable for forming in said perpendicular magnetic anisotropy film a bit having magnetization in a second direction opposite to the first direction.*

* * * * *